US010821760B2

(12) United States Patent
Zhou et al.

(10) Patent No.: US 10,821,760 B2
(45) Date of Patent: *Nov. 3, 2020

(54) INKJET PRINTING

(71) Applicant: Hewlett-Packard Development Company, L.P., Spring, TX (US)

(72) Inventors: Zhang-Lin Zhou, San Diego, CA (US); Rodney David Stramel, San Diego, CA (US); Gregg A. Lane, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/331,239

(22) PCT Filed: Feb. 7, 2017

(86) PCT No.: PCT/US2017/016785
§ 371 (c)(1),
(2) Date: Mar. 7, 2019

(87) PCT Pub. No.: WO2018/144039
PCT Pub. Date: Aug. 9, 2018

(65) Prior Publication Data
US 2019/0184725 A1 Jun. 20, 2019

Related U.S. Application Data

(63) Continuation-in-part of application No. PCT/US2017/015911, filed on Jan. 31, 2017, which
(Continued)

(51) Int. Cl.
*B41J 11/02* (2006.01)
*B41M 5/00* (2006.01)
(Continued)

(52) U.S. Cl.
CPC ........ *B41M 5/0017* (2013.01); *B41M 7/0081* (2013.01); *C09D 11/101* (2013.01);
(Continued)

(58) Field of Classification Search
None
See application file for complete search history.

(56) References Cited

U.S. PATENT DOCUMENTS 6,294,592 B1 9/2001 Herrmann et al.
6,352,805 B1 * 3/2002 Taylor ................... G03C 11/08
347/105
(Continued)

FOREIGN PATENT DOCUMENTS

EP 0338830 10/1989
EP 1792956 6/2007
(Continued)

OTHER PUBLICATIONS

International Search Report dated Oct. 5, 2017 for PCT/US2017/016785, Applicant Hewlett-Packard Development Company, L.P.

*Primary Examiner* — Erica S Lin
(74) *Attorney, Agent, or Firm* — Thorpe North & Western LLP

(57) ABSTRACT

The present disclosure relates to an inkjet printing process that comprises inkjet printing an inkjet ink composition onto a substrate to form a printed inkjet ink layer. The inkjet ink composition comprises a colorant, a curable polyurethane dispersion, a photoinitiator and water, wherein the amount of curable polyurethane dispersed in the inkjet ink composition is 0.1 to 30 weight %. A radiation-curable overcoat composition is inkjet printed over the printed inkjet ink layer as an overcoat layer. The overcoat composition comprises a curable polyurethane dispersion, a photoinitiator and water, wherein the amount of curable polyurethane dispersed in the overcoat composition is 0.1 to 30 weight %. The printed
(Continued)

inkjet ink layer is cured by exposing both the printed inkjet ink layer and the overcoat layer on the substrate to radiation.

15 Claims, 1 Drawing Sheet

Related U.S. Application Data is a continuation-in-part of application No. PCT/US2017/015912, filed on Jan. 31, 2017, and a continuation-in-part of application No. PCT/US2017/015913, filed on Jan. 31, 2017.

(51) Int. Cl.
| | |
|---|---|
| *C09D 11/322* | (2014.01) |
| *C09D 11/54* | (2014.01) |
| *C09D 11/40* | (2014.01) |
| *C09D 11/101* | (2014.01) |
| *B41M 7/00* | (2006.01) |
| *C09D 11/38* | (2014.01) |
| *B41M 5/52* | (2006.01) |

(52) U.S. Cl.
CPC ............ *C09D 11/322* (2013.01); *C09D 11/38* (2013.01); *C09D 11/40* (2013.01); *C09D 11/54* (2013.01); *B41M 5/5209* (2013.01); *B41M 5/5281* (2013.01)

(56) References Cited

U.S. PATENT DOCUMENTS

| | | |
|---|---|---|
| 7,578,587 B2 | 8/2009 | Belelie et al. |
| 8,087,768 B2 | 1/2012 | Daems et al. |
| 8,128,744 B2 | 3/2012 | Luer et al. |
| 8,235,517 B2 | 8/2012 | Grant et al. |
| 8,697,768 B2 | 4/2014 | Seung |
| 8,783,842 B2 | 7/2014 | Ingle et al. |
| 8,857,977 B2 | 10/2014 | Grant et al. |
| 8,931,889 B2 | 1/2015 | Roberts et al. |
| 9,458,339 B2 | 10/2016 | De Rossi et al. |
| 9,523,012 B2 | 12/2016 | Brandstein et al. |
| 9,605,180 B2 | 3/2017 | Illsley et al. |
| 2002/0064397 A1 | 5/2002 | Kellie et al. |
| 2006/0088674 A1 | 4/2006 | Hladik et al. |
| 2011/0008542 A1 | 1/2011 | Zeng et al. |
| 2011/0143040 A1* | 6/2011 | Yamasaki ............ C09D 11/324 427/427.4 |
| 2014/0285568 A1 | 9/2014 | Loccufier et al. |
| 2015/0030823 A1 | 1/2015 | Stamatoukos et al. |
| 2016/0053124 A1* | 2/2016 | Brandstein ........... C09D 11/101 347/102 |
| 2016/0271970 A1 | 9/2016 | Illsley et al. |
| 2016/0347960 A1 | 12/2016 | Morita et al. |
| 2017/0028688 A1 | 2/2017 | Dannhauser et al. |
| 2017/0101547 A1 | 4/2017 | Loccufier et al. |

FOREIGN PATENT DOCUMENTS

| | | | |
|---|---|---|---|
| EP | 2657308 | 12/2013 | |
| GB | 2512430 | 10/2014 | |
| JP | H07140901 | 6/1995 | |
| JP | 2005255833 | 9/2005 | |
| RU | 2456306 | 7/2012 | |
| WO | 9838241 | 9/1998 | |
| WO | 2006111707 | 10/2006 | |
| WO | WO-2014162290 A1 * | 10/2014 | ........... C09D 11/322 |
| WO | 2015152862 | 10/2015 | |
| WO | 2016122569 | 8/2016 | |
| WO | 2016143889 | 9/2016 | |
| WO | 2016164220 | 10/2016 | |

* cited by examiner

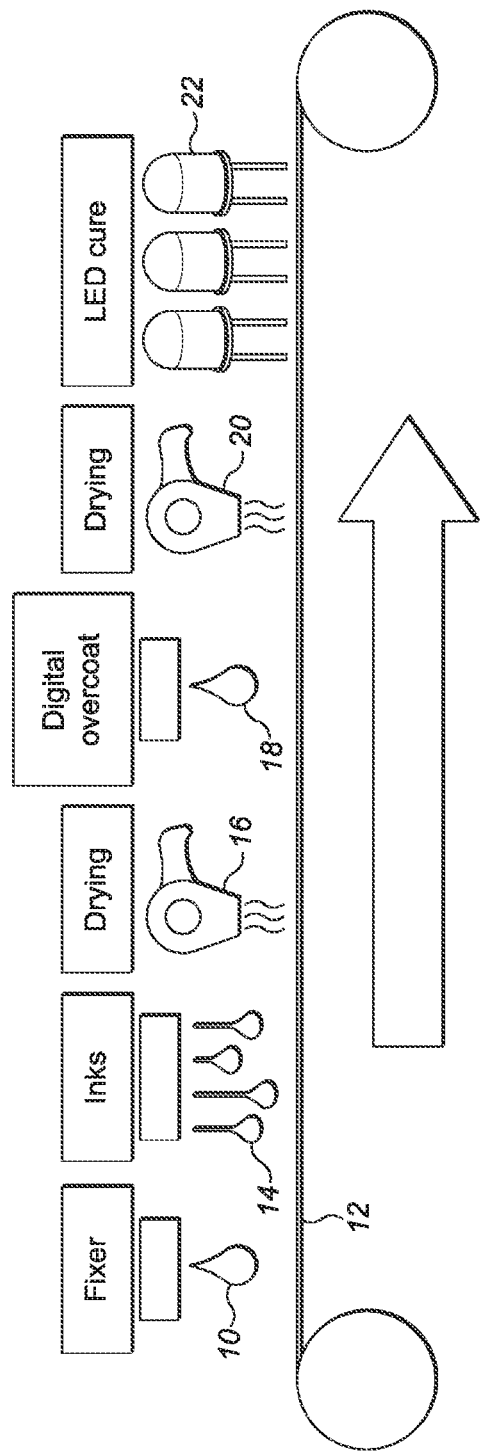

INKJET PRINTING

BACKGROUND

Inkjet printing is a printing method that utilizes electronic signals to control and direct droplets or a stream of ink onto print media. Inkjet printing may involve forcing ink drops through small nozzles by thermal ejection, piezoelectric pressure or oscillation onto the surface of the media. This technology can be used to record images on various media surfaces (e.g. paper).

In inkjet printing, curable polymer binders may be added to inkjet inks to improve the durability of the resulting print. Such binders may be cured, for example, by exposure to radiation e.g. UV radiation.

BRIEF DESCRIPTION OF THE DRAWINGS

Various implementations are described, by way of example, with reference to the accompanying drawings, in which:

FIG. 1 is a schematic diagram illustrating, by way of example, an example of a printing process of the present disclosure.

DETAILED DESCRIPTION

Before the present disclosure is disclosed and described, it is to be understood that this disclosure is not limited to the particular process steps and materials disclosed in this disclosure because such process steps and materials may vary. It is also to be understood that the terminology used in this disclosure is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used in this disclosure, "overcoat" in the context of the present disclosure refers to a composition that is applied to a print substrate as an overcoat layer over the inkjet ink composition. The overcoat composition may be substantially colourless and clear or transparent. Accordingly, the overcoat composition may be substantially free from colorants (e.g. pigment or dyes), and may have no substantive effect on the colour of an underlying coloured image printed from inkjet ink.

As used in this disclosure, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the overcoat or inkjet ink composition.

As used herein, the term "transparent" is used to describe a composition that allows light to pass therethrough. In the context of the overcoat composition, the term "transparent" may mean that the composition allows light to pass through it such that, when the overcoat composition is applied over a printed image of at a thickness of 3 microns or less, for instance, 1.5 to 2 microns (e.g. 1.5 microns), the printed image may be clearly visible to the naked eye. In some examples, the overcoat composition may be transparent, whereby, when the overcoat composition is applied over a printed image of at a thickness of 1.5 microns, the colours in the coated image are substantially the same as the colours in the uncoated image. In some examples, the difference in the colour(s) of the coated and un-coated images may be small. Reference is made to ASTM D1729-96 (Reapproved 2009, which specifies the equipment and procedures for visual appraisal of colours and colour differences of opaque materials that are diffusely illuminated. In some examples, the delta E (determined according to CIE94) between the colours of the coated and un-coated image may be 3 or less, for example, 2 or less. In some examples, the delta E (determined according to CIE94) may be 1.5 or less, for example, 1 or less.

Optical density or absorbance is a quantitative measure expressed as a logarithmic ratio between the radiation falling upon a material and the radiation transmitted through a material.

$$A_\lambda = -\log_{10}\left(\frac{I_1}{I_0}\right),$$

where $A_\lambda$ is the absorbance at a certain wavelength of light ($\lambda$), $I_1$ is the intensity of the radiation (light) that has passed through the material (transmitted radiation), and $I_0$ is the intensity of the radiation before it passes through the material (incident radiation). The incident radiation may be any suitable white light, for example, day light or artificial white light. The optical density or delta E of an image may be determined using methods that are well-known in the art. For example, optical density and/or delta E may be determined using a spectrophotometer. Suitable spectrophotometers are available under the trademark X-rite.

As used in this disclosure, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description in this disclosure.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented in this disclosure in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

The present disclosure relates to an inkjet printing process that comprises inkjet printing an inkjet ink composition onto a substrate to form a printed inkjet ink layer. The inkjet ink composition comprises a colorant, a curable polyurethane dispersion, a photoinitiator and water, wherein the amount of curable polyurethane dispersed in the inkjet ink composition is 0.1 to 30 weight %. A radiation-curable overcoat composition is inkjet printed over the printed inkjet ink layer as an overcoat layer. The overcoat composition comprises a curable polyurethane dispersion, a photoinitiator and water, wherein the amount of curable polyurethane dispersed in the overcoat composition is 0.1 to 30 weight %. The printed inkjet ink layer is cured by exposing both the printed inkjet ink layer and the overcoat layer on the substrate to radiation.

The present disclosure also relates to a printed substrate comprising an ink layer comprising a colorant disposed over the substrate and an overcoat layer disposed over the ink layer, wherein the printed substrate comprises a crosslinked polyurethane network that surrounds the colorant and extends from the ink layer to the overcoat layer.

Polyurethane dispersions may be used as curable polymer binders in aqueous curable inkjet ink compositions to improve the durability of the printed ink on the substrate. However, it can be difficult to achieve adequate durability without compromising other characteristics of the inkjet ink composition. For example, while high levels of polymer binder can improve durability, excessive levels of curable polymer binder can affect the jettability of the inkjet ink composition. The latter can have a negative effect on the printed image, as well as on the lifespan of the printhead. Moreover, aqueous curable inks comprising e.g. yellow or black colorants may be difficult to cure because these colorants may be strong absorbers of e.g. UV light. While curing may be improved by increasing the polyurethane and/or photoinitiator content of the inkjet ink, this may have a detrimental effect on the jettability of the ink composition.

In the present disclosure, a polyurethane dispersion is included in an overcoat composition that is applied as an overcoat layer over the inkjet ink composition. This can allow higher levels of polyurethane to be deposited onto the substrate to enhance durability. At the same time, the polyurethane content of the inkjet ink composition can be kept below a threshold to maintain desired levels of jettability. The relative concentrations of polyurethane in the overcoat composition and inkjet ink composition may be tailored to provide the desired levels of durability, while maintaining jettability of the overcoat and inkjet ink compositions. The presence of an overcoat layer over the inkjet ink layer may also reduce or eliminate exposure of the inkjet ink layer to oxygen, facilitating cure of the inkjet ink layer.

Furthermore, in the present disclosure, both the overcoat composition and the inkjet ink composition comprise curable polyurethane. Thus, when the overcoat and the inkjet ink are exposed to radiation, photoinitiators in the overcoat and inkjet ink generate reactive species e.g. radicals. These reactive species react to cure the polyurethane in the overcoat and inkjet ink, forming a crosslinked polyurethane network that extends from the inkjet ink layer to the overcoat layer. This crosslinked polyurethane network can help to retain colorant on the substrate, improving the durability of the printed image on the substrate. In some examples, reactive groups of the polyurethane in the overcoat layer crosslink with reactive groups of the polyurethane in the ink layer. In some examples, the crosslinked polyurethane network surrounds the colorant in the ink layer.

Overcoat

The overcoat composition comprises water, a photoinitiator and a curable polyurethane dispersion. The overcoat composition may additionally comprise a surfactant.

Water may be present in the overcoat composition in an amount of at least 30 weight %, for example, at least 40 or 50 weight %. In some examples, water may be present in the overcoat composition in an amount of at least 60 weight %. Water may be present in an amount of at most 99 weight %, for example, at most 95 weight %. In some examples, water may be present in the overcoat composition in an amount of 30 to 99 weight %, for instance, 40 to 98 weight % or 50 to 95 weight %. In other examples, water may be present in an amount of 60 to 93 weight %, for instance, 70 to 90 weight %.

Any suitable photoinitiator may be employed in the overcoat composition. The photoinitiator initiates the polymerization and/or crosslinking of the radiation-curable polyurethane upon exposure to radiation. The photoinitiator may be the same or different from the photoinitiator employed in the inkjet ink composition. Suitable photoinitiators are described in relation to the overcoat composition below. However, for the avoidance of doubt, the water-soluble photoinitiators described in relation to the inkjet ink composition may be used in the overcoat composition, if desired.

Some examples of the photoinitiator include 1-[4-(2-Hydroxyethoxy)-phenyl]-2-hydroxy-2-methyl-1-propane-1-one (which is commercially available from BASF Corp. as IRGACURE® 2959); acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Iodonium, (4-methylphenyl)[4-(2-methylpropyl)phenyl]-, hexafluorophosphate(I-) (which is commercially available from BASF Corp. as IRGACURE® 250); a high-molecular-weight sulfonium salt (e.g., IRGACURE® 270, commercially available from BASF Corp.); 2-Benzyl-2-dimethylamino-1-(4-morpholinophenyl)-butanone-1 (which is commercially available from BASF Corp. as IRGACURE® 369); alpha amino ketone photoinitiator (e.g., IRGACURE® 379, commercially available from BASF Corp.); a liquid blend of alpha hydroxy ketone/benzophenone photoinitiator (e.g., IRGACURE® 500, commercially available from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives.

The photoinitiator may be present in the overcoat composition in an amount ranging from about 0.1 wt % to about 20 wt. % of the total weight of the overcoat composition. In another example, the photoinitiator is present in the in the inkjet ink in an amount ranging from about 0.2 wt % to about 15 wt %, for example, 0.5 wt % to 10 wt % or 0.5 to 5 wt % of the total weight of the overcoat composition.

Any suitable curable polyurethane dispersion may be included in the overcoat composition. The polyurethane dispersion may be UV-curable, for example, curable by UV-LED. Suitable UV-LED wavelengths include 365 nm, 385 nm, 395 nm or 405 nm. In one example, the polyurethane may be curable by UV-LED at 365 nm, 385 nm or 395 nm. In one example, the polyurethane may be curable by UV-LED at 395 nm.

The polyurethane may be the same as or different from the polyurethane present in the inkjet ink composition. In some examples, the polyurethane may be the same. Suitable polyurethanes are described below.

In some examples, polyurethane dispersions comprise polyurethane polymer particles dispersed in water. The particles may range from about 10 to about 200 nm in size. The polyurethane can have a molecular weight (Mw) in the range of about 1,000 to 100,000 or in the range of about 5,000 to about 50,000. The polyurethane may have a NCO/OH ratio of 1.2 to 5 and an acid number of 20 to 100. The double bond density of the polyurethane may be 1.5 to 20, for example, 2 to 10.

The polyurethane may be formed from the reaction of a diisocyanate and a polyol. The diisocyanate can be an aliphatic diisocyanate or an aromatic diisocyanate.

In some examples, the polyol can be a diol selected from the group of: cyclic diols (e.g. 1,3-cyclohexanedimethanol and 1,4-cyclohexanedimethanol); aliphatic polycarbonate diols; polyether diols; polyethylene glycol; polypropylene glycol; polytetramethylene glycol; poly(ethylene oxide) polymers: poly(propylene oxide) polymers; poly(tetramethylene oxide) polymers; copolymers thereof having terminal hydroxyl groups derived from polyhydric compounds including diols; and combinations thereof. In one aspect, the diol can be a cyclic diol. In another aspect, the diol can be an aliphatic cyclic diol.

Additionally or as an alternative to the polyols mentioned above, the polyol may an acrylate-containing diol or a methacrylate-containing diol. Examples include:

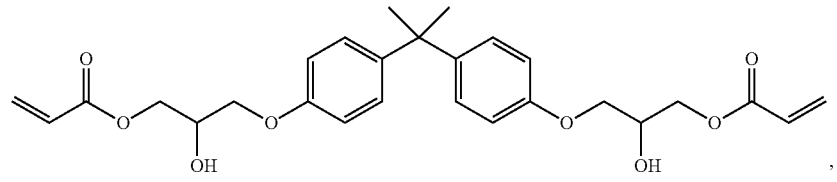

(XVII)

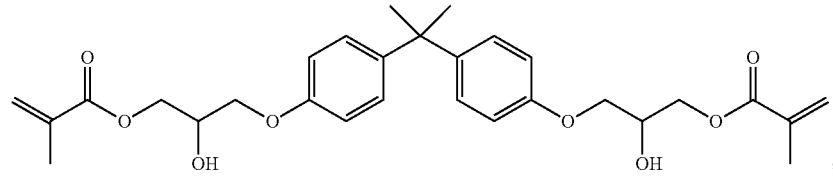

(XVIII)

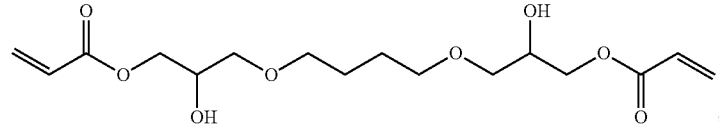

(XIX)

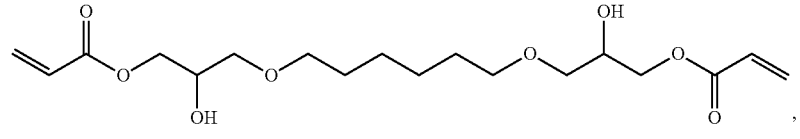

(XX)

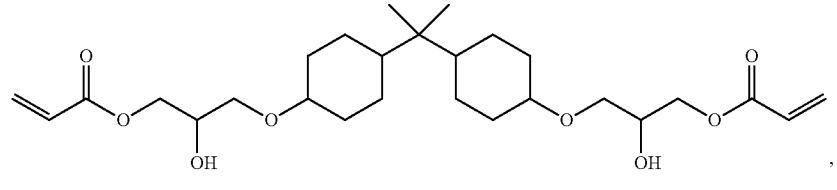

(XXI)

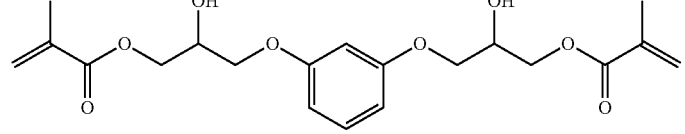

(XXII)

Examples of suitable diisocyanates include methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis(4-cyclohexyl)diisocyanate, p-phenylene diisocyanate, isophorone diisocyanate, 1,5-naphthalene diisocyanate and mixtures thereof.

In some examples, the polyurethane is a water-dispersible acrylic functional polyurethane. In some other examples, polyurethane is a water-dispersible (meth)acrylated polyurethane. Suitable water-dispersible (meth)acrylated polyurethane are commercially available under the trademarks Ucecoat®6558, Ucecoat®6559, Ebecryl®2002 and Ebecryl®2003 (Cytec).

In some examples, the polyurethane dispersions are water-dispersible (meth)acrylated polyurethane, sold under the trade name of NeoRad® R441 by NeoResins (Avecia). Other representative but non limiting examples of suitable polyurethane dispersions include Ucecoat®7710, Ucecoat®7655 (available from Cytec), Neorad®R440, Neorad®R441, Neorad®R447, Neorad®R448 (available from DSM NeoResins), Bayhydrol®UV 2317, Bayhydrol®UV VP LS 2348 (available from Bayer), Lux®430, Lux®399, Lux®484 (available from Alberdingk Boley), Laromer®R8949, Laromer®LR8983, Laromer®PE22WN, Laromer®PE55WN, Laromer®UA9060 (available from BASF).

In some examples, the curable polyurethane is a pH stable polyurethane. pH stable polyurethane may form pH stable polyurethane dispersions that may be resistant to hydrolysis. In some examples, the pH of the pH stable polyurethane dispersions may remain substantially stable when the dispersions are stored for a period of time. Thus, inkjet inks formed using such pH stable polyurethanes may have a longer shelf-life, as the tendency for pigments dispersed in the inkjet ink composition to crash out of the inkjet ink composition may be reduced.

The pH stable polyurethane may comprise a polyurethane polymer comprising a polyurethane backbone having at least one terminal (or capping) group selected an acrylamide-containing group, a styrene-containing group, an allyl-containing group:

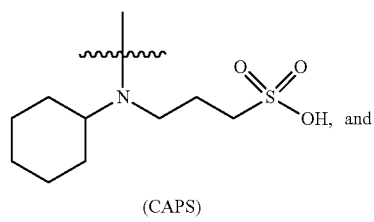

(CAPS)

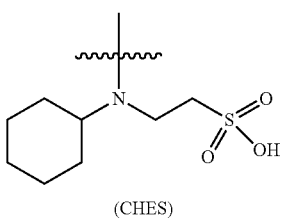

(CHES)

For avoidance of doubt the CAPS and CHES terminal groups above may be in anionic form, namely:

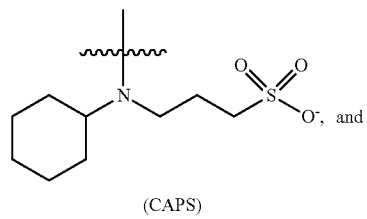

(CAPS)

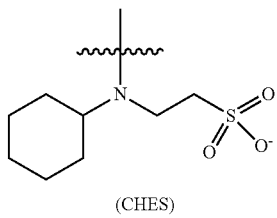

(CHES)

Where the terminal group is selected from CAPS or CHES, these capping groups (CAPS) and (CHES) may be formed by reacting a polyurethane pre-polymer with 3-(cyclohexylamino)-1-propanesulfonic acid and/or 2-(cyclohexylamino)ethanesulfonic acid. The 3-(cyclohexylamino)-1-propanesulfonic acid and 2-(cyclohexylamino)ethanesulfonic acid may react with terminal —N=C=O groups on the polyurethane pre-polymer. These capping groups may help to stabilise the polyurethane dispersion.

Where the terminal or capping group is an acrylamide, the acrylamide-containing capping group may be $CH_2=CHC(O)NH(CH_2)_nO—$, wherein n is an integer from 1 to 10. In some examples, n is 1 to 6, for instance, 1 to 4. In one example, the acrylamide-containing capping group may be a group of the formula below:

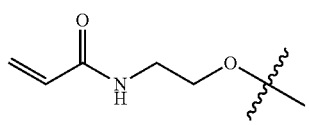

(I)

The acrylamide-containing group may be formed by reacting a polyurethane pre-polymer with an acrylamide-containing monoalcohol or monoamine. For example, the acrylamide-containing monoalcohol may react with terminal —N=C=O groups on the polyurethane pre-polymer. An example of a suitable acrylamide-containing mono-alcohol may be:

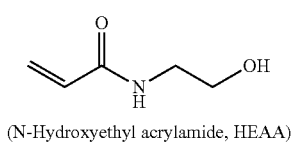

(N-Hydroxyethyl acrylamide, HEAA)

Where the capping group comprises a styrene-containing group, suitable styrene-containing capping groups may include:

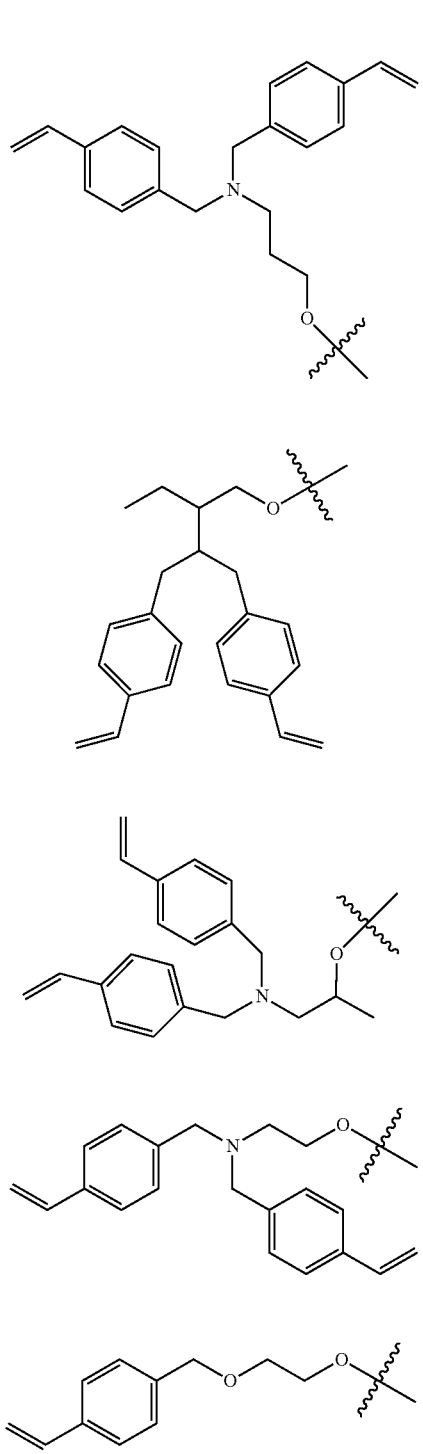

The styrene-containing group (e.g. Groups (II) to (VI)) above may be formed by reacting the suitable styrene-containing mono-alcohols or monoamines with the polyurethane pre-polymer. For example, the styrene-containing monoalcohol may react with terminal —N=C=O groups on the polyurethane pre-polymer. The styrene-containing mono-alcohols corresponding to Groups (II) to (VI) may be:

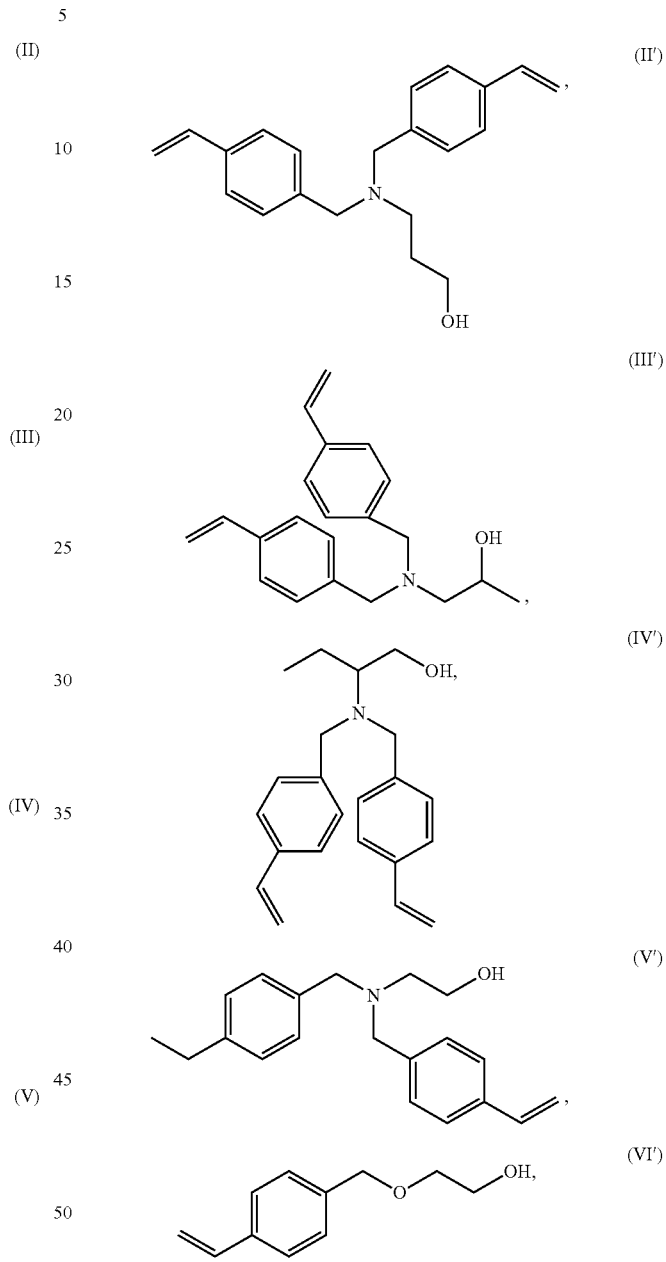

Where the capping group comprises an allyl-containing group, the allyl-containing group may comprise an allyl ether group or an allyl amine group. Suitable allyl-containing capping groups may include:

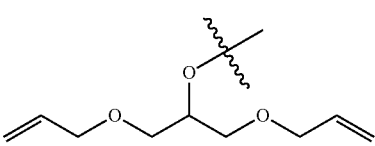

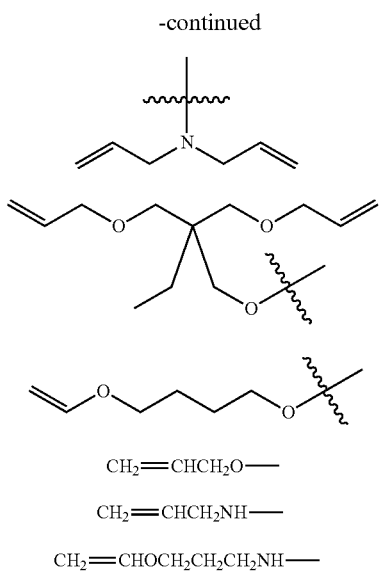

(VIII)

(IX)

(X)

$CH_2$=$CHCH_2O$— (XI)

$CH_2$=$CHCH_2NH$— (XII)

$CH_2$=$CHOCH_2CH_2CH_2NH$— (XIII)

Allyl-containing groups (e.g. Groups (VII) to (XIII) above) may be formed by reacting the suitable allyl-containing mono-alcohols or monoamines with a polyurethane pre-polymer. For example, the allyl-containing monoalcohol or monoamine may react with terminal —N=C=O groups on the polyurethane pre-polymer. The allyl-containing mono-alcohols or monoamines corresponding to Groups (VII) to (XIII) above may be:

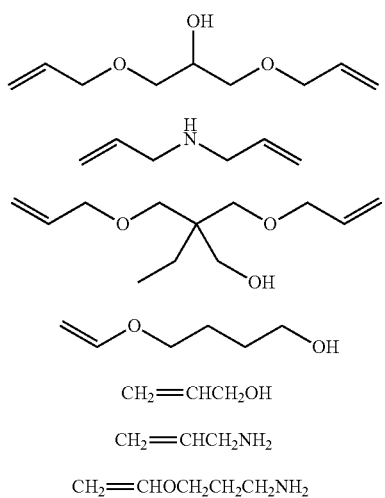

(VII')

(VIII')

(IX')

(X')

$CH_2$=$CHCH_2OH$ (XI')

$CH_2$=$CHCH_2NH_2$ (XII')

$CH_2$=$CHOCH_2CH_2CH_2NH_2$ (XIII')

In one example, the polyurethane dispersion may comprise polyurethane polymers that comprise polyurethane backbones having terminal groups selected from acrylamide-containing groups, styrene-containing groups, and allyl-containing groups. The dispersion may be devoid of polyurethane polymers that comprise polyurethane backbones having terminal methacrylate-containing or acrylate-containing groups.

In one example, the polyurethane dispersion may comprise (A)(i) at least one polyurethane polymer comprising a polyurethane backbone having at least one terminal (or capping) group selected from an acrylamide-containing group, a styrene-containing group, an acrylate-containing group, a methacrylic-containing group and an allyl-containing group, and (ii) at least one polyurethane polymer comprising a polyurethane backbone having at least one terminal (or capping) ionic group; and/or (B) at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and at the opposite end with a terminal ionic group.

In the polyurethane that is dispersed in the overcoat composition, 1 to 99 weight % of the capping groups may be ionic groups, while 99 to 1 weight % of the capping groups may be selected from an acrylamide-containing group, a styrene-containing group, an acrylate-containing group, a methacrylic-containing group and an allyl-containing group. In some examples, 5 to 70 weight % of the capping groups may be ionic groups, while 95 to 30 weight % of the capping groups may be selected from an acrylamide-containing group, a styrene-containing group, an acrylate-containing group, a methacrylic-containing group and an allyl-containing group. In some examples, 10 to 50 weight % of the capping groups may be ionic groups, while 90 to 50 weight % of the capping groups may be selected from an acrylamide-containing group, a styrene-containing group, an acrylate-containing group, a methacrylic-containing group and an allyl-containing group. In other examples, 20 to 40 weight % of the capping groups may be ionic groups, while 80 to 60 weight % of the capping groups may be selected from an acrylamide-containing group, a styrene-containing group, an acrylate-containing group, a methacrylic-containing group and an allyl-containing group.

In one example, the polyurethane dispersion may comprise (B) at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and capped at the opposite end with a terminal ionic group.

In one example, the polyurethane dispersion may comprise (B) at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and capped at the opposite end with a terminal ionic group; and (C) at least one polyurethane polymer comprising a polyurethane backbone that is capped at both ends with a terminal (or capping) group selected from an acrylamide-containing group, a styrene-containing group, an acrylate-containing group, a methacrylic-containing group and an allyl-containing group or (D) at least one polyurethane polymer comprising at least one polyurethane polymer comprising a polyurethane backbone that is capped at both ends with ionic groups.

In one example, the polyurethane dispersion may comprise (B) at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and capped at the opposite end with a terminal ionic group; (C) at least one polyurethane polymer comprising a polyurethane backbone that is capped at both ends with a terminal (or capping) group selected from an acrylamide-containing group, a styrene-containing group, an acrylate-containing group, a methacrylic-containing group and an allyl-containing group and (D) at least one polyurethane polymer comprising at least one polyurethane polymer comprising a polyurethane backbone that is capped at both ends with ionic groups.

The ionic group may contain a carboxylate group, carboxylic acid group, a sulphonate group and/or a sulphonic acid group. The ionic group may be formed by reacting an amino carboxylic acid or an amino sulphonic with a polyurethane pre-polymer, for example, with terminal —N=C=O groups on the polyurethane pre-polymer. Suitable amino sulphonic acids include taurine, CAPS or CHES (see above). The ionic groups may help to keep the polyurethane particles in dispersion in water.

In one example, the polyurethane dispersion may comprise at least one polyurethane polymer comprising a polyurethane backbone having at least one terminal (or capping) group selected from a methacrylic-containing group and/or an acrylate-containing group, and at least one polyurethane polymer comprising a polyurethane backbone having at least one terminal (or capping) ionic group selected from

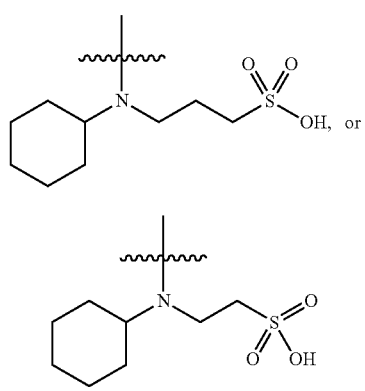

and/or at least one polyurethane polymer comprising a polyurethane backbone that is capped at one end with a terminal (or capping) group selected from a methacrylic-containing group and/or an acrylate-containing group, and at the opposite end with a terminal group selected from CAPS or CHES above. In the polyurethane that is dispersed in the overcoat composition 1 to 99 weight % of the capping groups may be CAPS and/or CHES, while 99 to 1 weight % of the capping groups may be selected from an acrylate-containing group and/or a methacrylic-containing group. In some examples, 5 to 70 weight % of the capping groups may be CAPS and/or CHES, while 95 to 30 weight % of the capping groups may be selected from an acrylate-containing group and/or a methacrylic-containing group. In some examples, 10 to 50 weight % of the capping groups may be CAPS and/or CHES, while 90 to 50 weight % of the capping groups may be selected from an acrylate-containing group and/or a methacrylic-containing group. In some examples, 20 to 40 weight % of the capping groups may be CAPS and/or CHES, while 80 to 60 weight % of the capping groups may be selected from an acrylate-containing group and/or a methacrylic-containing group.

In one example, the polyurethane dispersion may comprise at least one polyurethane polymer comprising a polyurethane backbone that is capped at one end with a terminal (or capping) group selected from an acrylate-containing group and/or a methacrylic-containing group and capped at the opposite end with a terminal CAPS or CHES group.

In one example, the polyurethane dispersion may comprise (i) at least one polyurethane polymer comprising a polyurethane backbone that is capped at one end with a terminal (or capping) group selected from an acrylate-containing group and/or a methacrylic-containing group, and capped at the opposite end with a terminal CAPS or CHES group; and (ii) at least one polyurethane polymer comprising a polyurethane backbone that is capped at both ends with a terminal (or capping) group selected from an acrylate-containing group and/or a methacrylic-containing group or (iii) at least one polyurethane polymer comprising at least one polyurethane polymer comprising a polyurethane backbone that is capped at both ends with terminal groups selected from CAPS and/or CHES groups.

In one example, the polyurethane dispersion may comprise (i) at least one polyurethane polymer comprising a polyurethane backbone that is capped at one end with a terminal (or capping) group selected from an acrylate-containing group and/or a methacrylic-containing group and capped at the opposite end with a terminal CAPS or CHES group; (ii) at least one polyurethane polymer comprising a polyurethane backbone that is capped at both ends with a terminal (or capping) group selected from an acrylate-containing group and/or a methacrylic-containing group and (iii) at least one polyurethane polymer comprising at least one polyurethane polymer comprising a polyurethane backbone that is capped at both ends with terminal groups selected from CAPS and/or CHES groups.

Suitable acrylate- or methacrylate-containing capping groups may include

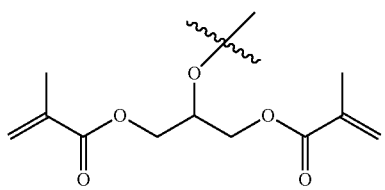

(XIV)

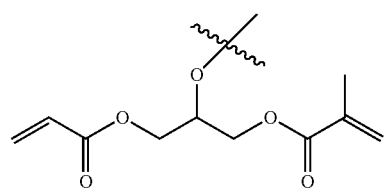

(XV)

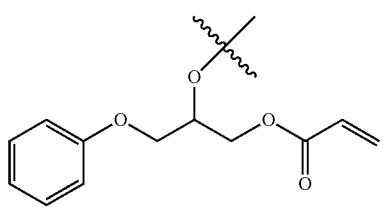

(XVI)

Groups (XIV) to (XIVI) above may be formed by reacting the corresponding methacrylate/acrylate-containing monoalcohols with a polyurethane pre-polymer, for example, with —N=C=O terminal groups on the pre-polymer.

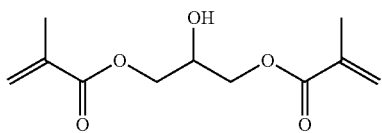

(XIV′)

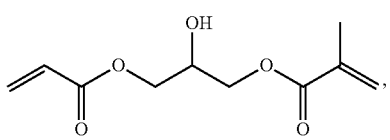

(XV′)

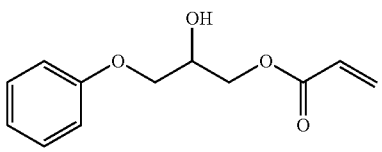

(XVI′)

The polyurethane backbone of the polyurethane polymers present in the pH stable polyurethane dispersion may be formed from the reaction between a reactive diol and a diisocyanate. The reactive diol may be selected from an acrylate-containing diol, a methacrylate-containing diol, an acrylamide-containing diol, styrene-containing diol, an allyl-containing diol and combinations thereof.

Suitable methacrylate-containing and acrylate-containing reactive diols include:

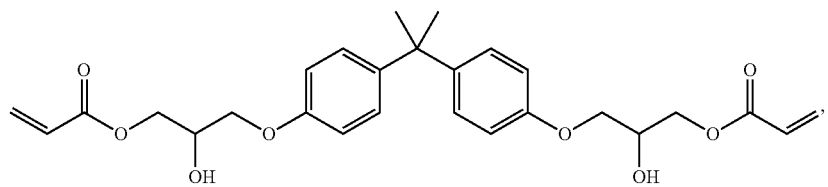

(BGDA-XVII)

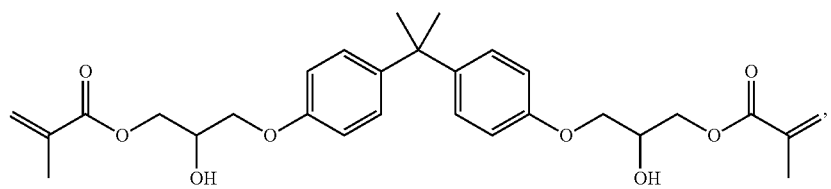

(XVIII)

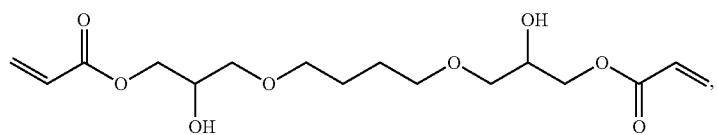

(XIX)

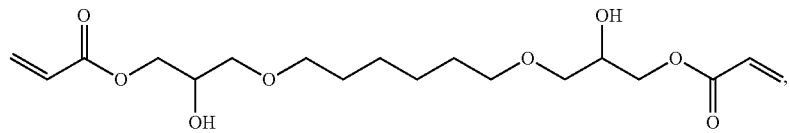

(XX)

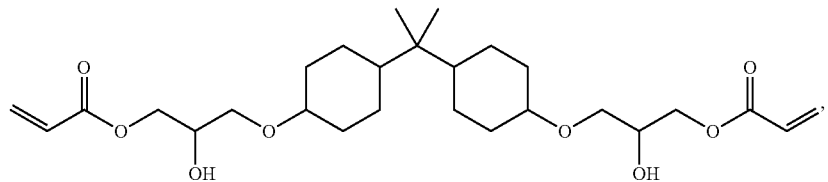

(XXI)

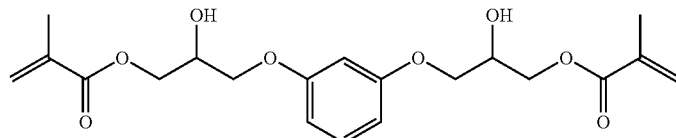

(XXII)

The reactive diol, (in addition to being a methacrylate-containing or acrylate-containing reactive diol) may also be a styrene-containing reactive diol selected from:

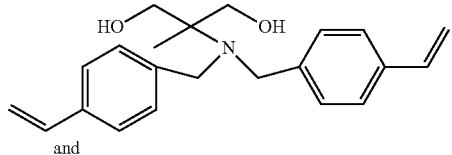
(XXIII)

and

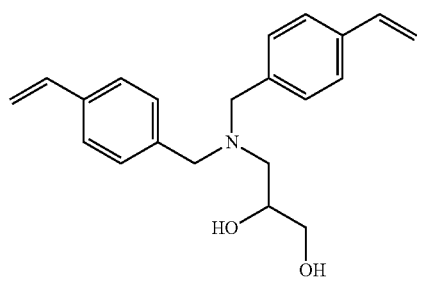
(XXIV)

The reactive diol may also be an allyl-containing containing diol selected from:

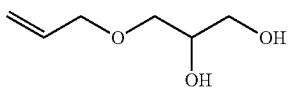
(XXV)

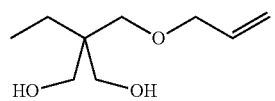
(XXVI)

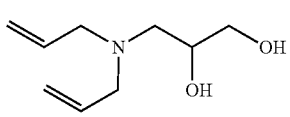
(XXVII)

Suitable diisocyanates include methylene diphenyl diisocyanate, hexamethylene diisocyanate, p-tetramethyl xylene diisocyanate, m-tetramethyl xylene diisocyanate, bitolylene diisocyanate, toluene diisocyanate, 4,4'-Methylene dicyclohexyl diisocyanate, p-phenylene diisocyanate, isophorone diisocyanate, 1,5-naphthalene diisocyanate, trimethylhexamethylene diisocyanate and mixtures thereof.

In one example, the diisocyanate is selected from at least one of 2,2,4-trimethyl hexamethylene diisocyanate, isophorone diisocyanate, hexamethylene diisocyanate, methylene diphenyl diisocyanate and 4,4'-Methylene dicyclohexyl diisocyanate.

A blend of two diisocyanates may be used. For example, the diisocyanates may be a blend of 4,4'-Methylene dicyclohexyl diisocyanate and hexamethylene diisocyanate.

In one example, a blend of at least two diisocyanates is reacted with a reactive diol to produce the polyurethane backbone. The reactive diol may be a methacrylate-containing and/or acrylate-containing reactive diol. In some examples, the reactive diol may be an acrylamide-containing reactive diol, an allyl-containing reactive diol and/or a styrene-containing reactive diol. In one example, the reactive diol may be a methacrylate-containing or acrylate-containing diol that is bisphenol A-free. As shown above, examples of such diols may include:

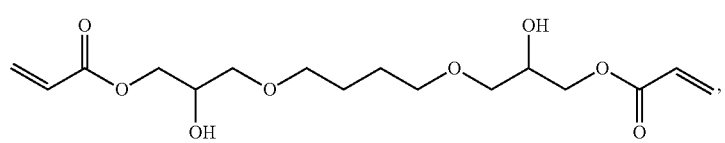
(XIX)

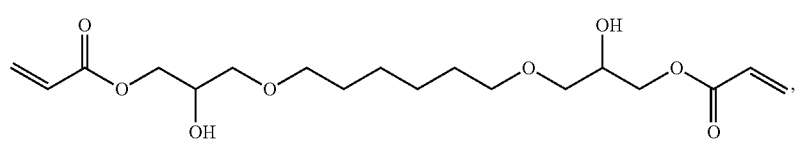
(XX)

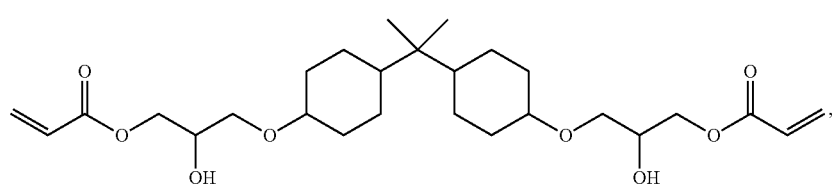
(XXI)

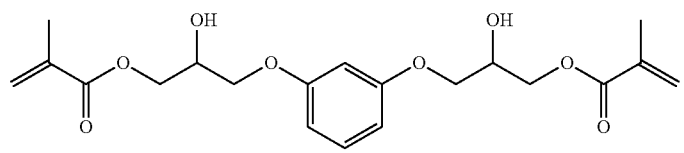
(XXII)

The polyurethane backbone may be devoid of any ionic side groups, for example, acid stabilisation groups (e.g. carboxylic or sulphonic acid groups). As mentioned above, such ionic groups may act as capping groups at the terminal end(s) of at least some of the polyurethane polymer strands in the polyurethane dispersion.

In one example, the polyurethane dispersion is formed by reacting a reactive diol with a diisocyanate to form a polyurethane pre-polymer. A polymerisation initiator may be used to initiate polymerisation. The NCO/OH ratio may range from greater to 1 to 8, for example, 1.2 to 5.

The polymerisation may be carried out to produce a polyurethane pre-polymer. Once the polyurethane pre-polymer is formed, a capping agent may be added to the reaction mixture. For example, the capping agent may be a mono-alcohol or monoamine selected from a methacrylate-containing monoalcohol, an acrylate-containing monoalcohol, a acrylamide-containing monoalcohol, a styrene-containing monoalcohol, an allyl-containing monoalcohol or an allyl-containing monoamine. The monoalcohol or monoamine may react with terminal —N═C═O groups on the polyurethane pre-polymer to cap the polyurethane pre-polymer. The reaction is carried out such that at least some of the polyurethane pre-polymer strands are capped by this reaction. In some examples, most of the polyurethane pre-polymer strands are capped by this reaction. For example, at least 10% of unreacted —N═C═O groups are capped by this reaction. In some instances, 40 to 99% or 50 to 90%, for instance, 60 to 85% of unreacted —N═C═O groups are capped by this reaction.

An amino carboxylic acid or an amino sulphonic acid may then be added to the reaction mixture. As mentioned above, suitable acids include taurine, 3-(cyclohexylamino)-1-propanesulfonic acid and 2-(cyclohexylamino)ethanesulfonic acid. The amino carboxylic acid or amino sulphonic acid may react with the remaining —N═C═O groups. These groups form can form ionic capping groups that help to stabilise the dispersion of polyurethane in e.g. water.

The pH stable curable polyurethane may have an acid number of 20 to 100. The pH stable curable polyurethane may have a double bond density from 1.5 to 1.0 meq/g.

The particle size range of the pH stable polyurethane dispersion may be 10 to 200 nm.

The amount of polyurethane (solids) dispersed in the overcoat composition may be 0.1 to 30 weight %, for example, 0.2 to 20 weight %. In some examples, the amount of polyurethane (solids) in the overcoat composition may be 0.5 to 10 weight %, for instance, 0.8 to 7.5 weight % or 1 to 5 weight %. In some examples, the amount of 1.5 to 3 weight % of the overcoat composition.

The overcoat composition may be formed using a pre-formed or commercially available polyurethane dispersion comprising polyurethane dispersed in its own solvent (e.g. water). The amount of polyurethane dispersion used to form the overcoat composition may be 1 to 30 weight %, for example, 5 to 10 weight % of the total weight of the overcoat composition.

Any suitable surfactant may be present in the overcoat composition. Where the inkjet ink composition also includes a surfactant, the surfactant present in the overcoat may be the same or different from the surfactant in the inkjet ink composition.

Suitable surfactants may include non-ionic, cationic, and/or anionic surfactants. Examples include a silicone-free alkoxylated alcohol surfactant such as, for example, TEGO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co.). Fluorosurfactants may also be employed.

When present, the surfactant present in the overcoat composition in an amount ranging from about 0.01 wt % to about 5 wt % based on the total wt % of the overcoat composition.

The overcoat composition may contain less than 0.01 wt % colorant, for example, less than 0.001 wt % colorant. The overcoat composition may be substantially free from colorant. In some examples, the overcoat composition may be substantially free from pigment or dye.

The overcoat composition may be transparent.

The overcoat composition may be made in-situ just before being applied to the substrate.

Inkjet Ink Composition

The inkjet ink composition comprises water, a colorant, a photoinitiator and a curable polyurethane dispersion. The inkjet ink composition may additionally comprise a surfactant.

Water may be present in the inkjet ink composition in an amount of at least 30 weight %, for example, at least 40 or 50 weight %. In some examples, water may be present in the inkjet ink composition in an amount of at least 60 weight %. Water may be present in an amount of at most 99 weight %, for example, at most 95 weight %. In some examples, water may be present in the inkjet ink composition in an amount of 30 to 99 weight %, for instance, 40 to 98 weight % or 50 to 95 weight %. In other examples, water may be present in an amount of 60 to 93 weight %, for instance, 70 to 90 weight %.

Any suitable colorant may be used in the inkjet ink composition. The colorant may be a pigment or a dye. In some examples, the colorant can be present in an amount from about 0.5 wt % to about 15 wt % based on a total wt % of the inkjet ink composition. In one example, the colorant can be present in an amount from about 1 wt % to about 10 wt %. In another example, the colorant can be present in an amount from about 5 wt % to about 10 wt %.

In other examples, the colorant may be a pigment or dye. In some examples, the colorant may be a pigment. As used herein, "pigment" generally includes organic or inorganic pigment colorants, magnetic particles, aluminas, silicas, and/or other ceramics, organo-metallics or other opaque particles, whether or not such particulates impart color. Thus, although the present description primarily illustrates the use of pigment colorants, the term "pigment" can be used more generally to describe pigment colorants, as well as other pigments such as organometallics, ferrites, ceramics, etc.

Suitable pigments include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G. IGRAZIN® Yellow 5GT, and IGRALITE® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL® 400R, REGAL® 330R, REGAL® 660R, MOGUL® L, BLACK PEARLS® L, MONARCH® 1400, MONARCH® 1300, MONARCH® 1100, MONARCH® 1000, MONARCH® 900, MONARCH® 880, MONARCH® 800, and MONARCH® 700. The following pigments are available from Orion Engineered Carbons GMBH: PRINTEX® U, PRINTEX® V, PRINTEX® 140U, PRINTEX® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71. Permanent Yellow GG, Hansa Yellow RA, Hansa Brilliant Yellow 5GX-02, Hansa Yellow-X. NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®. RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific examples of a cyan colour pigment may include C.I. Pigment Blue −1, −2, −3, −15, −15:1, −15:2, −15:3, −15:4, −16, −22, and −60.

Specific examples of a magenta colour pigment may include C.I. Pigment Red −5, −7, −12, −48, −48:1, −57, −112, −122, −123, −146, −168, −177, −184, −202, and C.I. Pigment Violet −19.

Specific examples of a yellow pigment may include C.I. Pigment Yellow −1, −2, −3, −12, −13, −14, −16, −17, −73, −74, −75, −83, −93, −95, −97, −98, −114, −128, −129, −138, −151, −154, and −180. While several examples have been given herein, it is to be understood that any other pigment or dye can be used that is useful in modifying the colour of the UV curable ink.

Specific examples of black pigment include carbon black pigments. An example of an organic black pigment includes aniline black, such as C.I. Pigment Black 1.

In some examples, the pigment may be a cyan, magenta, black or yellow pigment.

It has been found that certain colorants e.g. black colorants can be strong absorbers of radiation (e.g. UV radiation). As a result they can be more difficult to cure. The amount of polyurethane in the inkjet ink composition and/or the overcoat composition may be varied depending on the nature of the colorant, for example, to ensure adequate curing and print durability.

Any suitable photoinitiator may be employed. The photoinitiator may be present in the inkjet ink composition in an amount ranging from about 0.1 wt % to about 10 wt % based on a total weight of the inkjet ink composition.

The photoinitiator may be the same or different from the photoinitiator employed in the inkjet ink composition. Suitable photoinitiators are described in relation to the overcoat composition above. However, in some examples, a water-soluble photoinitiator described in relation to the inkjet ink composition may be used.

The water soluble photoinitiator may be a trimethylbenzoylphenylphosphinic acid metal salt (i.e., TPA salt) having a formula (I) of:

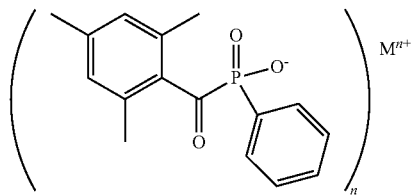

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

The TPA salt may be formed from ethyl (2,4,6-trimethylbenzoyl) phenylphosphinate (TPO-L) and a metal salt. The ethyl (2,4,6-trimethylbenzoyl) phenylphosphinate may be added to a suitable solvent (e.g., methyl ethyl ketone (MEK)) to form a solution, and then the metal salt may be added to the solution. The solution may be heated and stirred at a predetermined temperature for a predetermined time to allow the reaction to take place. As a result of the reaction, a solid TPA salt may form. This salt may be collected, washed, and dried.

Two example synthetic pathways for forming a lithium TPA salt (TPA-Li) and a sodium TPA salt (TPA-Na) are shown in the schemes below:

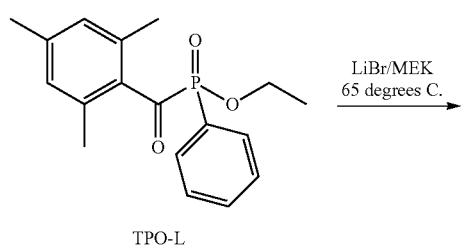

TPO-L

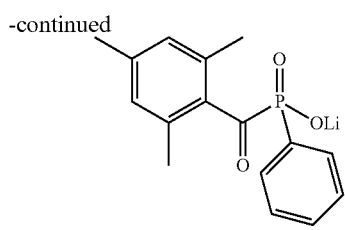

TPA-Li

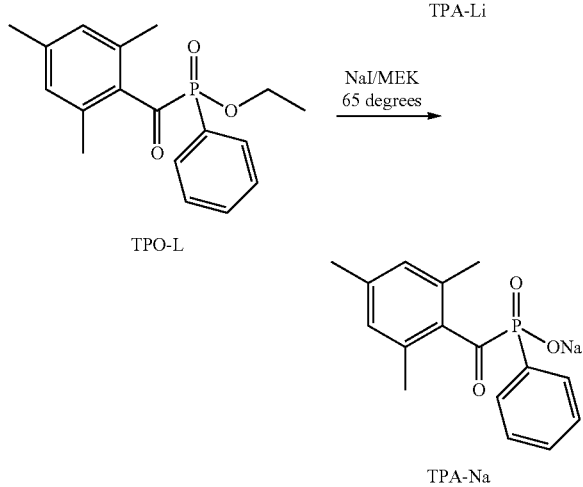

TPO-L

NaI/MEK
65 degrees
→

TPA-Na

The solubility of the water soluble photoinitiator disclosed herein may be high. In one example, the water soluble photoinitiator can have a water solubility of at least 0.1 wt %. When the water solubility is at least 0.1 wt %, it means that of the total wt % of the water soluble photoinitiator added to water, at least 0.1 wt % of the total is water soluble. In some instances, the water soluble photoinitiator may have a water solubility of at least 0.5 wt %. In some instances, the water soluble photoinitiator may have a water solubility up to about 20 wt %.

The water soluble photoinitiator may be used in combination with a sensitizer. The sensitizer may be a water soluble polymeric sensitizer that includes a functionalized anthrone moiety, a polyether chain, and an amide linkage or an ether linkage attaching one end of the polyether chain to the functionalized anthrone moiety. The anthrone moiety may be a thioxanthrenone moiety.

In one example, the polymeric sensitizer has a formula (Q):

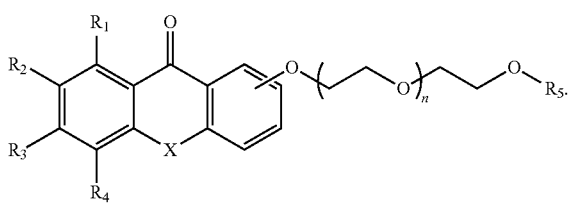

where $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —NO$_2$, —O—R$_d$, —CO—R$_d$, —CO—O—R$_d$, —O—CO—R$_d$, —CO—NR$_d$R$_e$, —NR$_d$R$_e$, —NR$_d$—CO—R$_e$, —NR$_d$—CO—O—R$_e$, —NR$_d$—CO—NR$_e$R$_f$, —SR$_d$, —SO—R$_d$, —SO—R$_d$, —SO$_2$—O—R$_d$, —SO$_2$NR$_d$R$_e$ and a perfluoroalkyl group. R$_d$, R$_e$, and R$_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In the formula Q above, X is O, S, or NH and the polyether chain has n number of repeating monomer units, where n ranges from 1 to 200. As depicting in the formula Q above, the linkage is an ether linkage.

When present, the sensitizer may be present in an amount of 0.1 wt % to about 10 wt % of the inkjet ink composition.

Any suitable curable polyurethane dispersion may be used to form the inkjet ink composition. For example, a pre-formed curable polyurethane dispersion may be added to the remaining ink components. Such a pre-formed curable polyurethane dispersion may comprise polyurethane dispersed in its own solvent (e.g. water). The curable polyurethane dispersion may be present in the inkjet ink composition in an amount of 0.1 to 30 weight % or 2 to 15 weight %, for example, 3 to 12 weight %.

The amount of polyurethane (solids) dispersed in the inkjet ink composition may be 0.1 to 30 weight %, for example, 0.2 to 20 weight %. In some examples, the amount of polyurethane (solids) in the inkjet ink composition may be 0.5 to 10 weight %, for instance, 0.8 to 7.5 weight % or 1 to 5 weight %. In some examples, the amount of 1.5 to 3 weight % of the inkjet ink composition.

In some examples, the relative concentrations of polyurethane in the overcoat composition and inkjet ink composition may be tailored to provide the desired levels of durability, while maintaining jettability of the overcoat and inkjet ink compositions. For instance, the amount of polyurethane (solids) in the inkjet ink composition may be 0.5 to 10 weight %, for instance, 0.8 to 7.5 weight % or 1 to 5 weight %, while the amount of polyurethane (solids) in the overcoat composition may be 0.5 to 10 weight %, for instance, 0.8 to 7.5 weight % or 1 to 5 weight %. In one example, the amount of polyurethane (solids) in the inkjet ink composition may be 2 to 4 weight %, while the amount of polyurethane (solids) in the overcoat composition may be 1.5 to 3 weight %.

The amount of polyurethane in the inkjet ink composition and/or overcoat composition may vary depending on, for example, the nature of the colorant as certain colorants absorb radiation (e.g. UV radiation) more than others and can inhibit cure.

Suitable curable polyurethanes are described in relation to the overcoat composition above. The curable polyurethane in the inkjet ink composition may be the same or different from the curable polyurethane in the overcoat composition. In some examples, the curable polyurethane is a pH stable polyurethane. pH stable polyurethane may form pH stable polyurethane dispersions that may be resistant to hydrolysis. In some examples, the pH of the pH stable polyurethane dispersions may remain substantially stable when the dispersions are stored for a period of time. Thus, inkjet inks formed using such pH stable polyurethanes may have a longer shelf-life, as the tendency for colorants dispersed in the inkjet ink composition to crash out may be reduced.

As discussed in relation to the overcoat composition, the pH stable polyurethane may comprise a polyurethane polymer comprising a polyurethane backbone having at least one terminal (or capping) group selected an acrylamide-containing group, a styrene-containing group, an allyl-containing group:

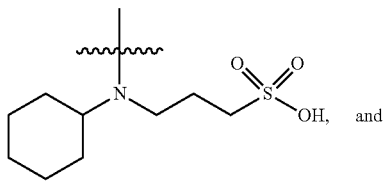
(CAPS)

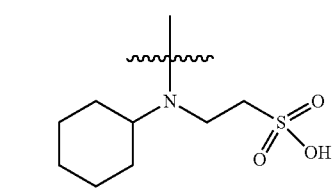
(CHES)

For avoidance of doubt the CAPS and CHES terminal groups above may be in anionic form, namely:

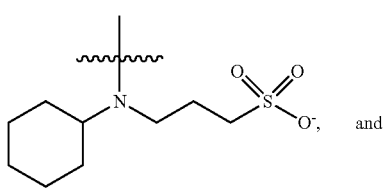
(CAPS)

and

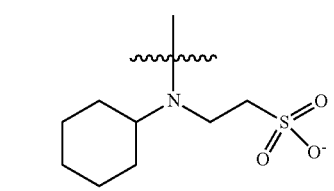
(CHES)

Where the terminal group is selected from CAPS or CHES, these capping groups (CAPS) and (CHES) may be formed by reacting a polyurethane pre-polymer with 3-(cyclohexylamino)-1-propanesulfonic acid and/or 2-(cyclohexylamino)ethanesulfonic acid. The 3-(cyclohexylamino)-1-propanesulfonic acid and 2-(cyclohexylamino) ethanesulfonic acid may react with terminal —N═C═O groups on the polyurethane pre-polymer. These capping groups may help to stabilise the polyurethane dispersion.

Where the terminal or capping group is an acrylamide, the acrylamide-containing capping group may be CH$_2$═CHC(O)NH(CH$_2$)$_n$O—, wherein n is an integer from 1 to 10. In some examples, n is 1 to 6, for instance, 1 to 4 or 2 to 3. In one example, the acrylamide-containing capping group may be a group of the formula below:

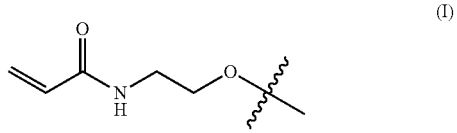
(I)

The acrylamide-containing group may be formed by reacting a polyurethane pre-polymer with an acrylamide-containing monoalcohol or monoamine. For example, the acrylamide-containing monoalcohol may read with terminal —N═C═O groups on the polyurethane pre-polymer. An example of a suitable acrylamide-containing mono-alcohol may be:

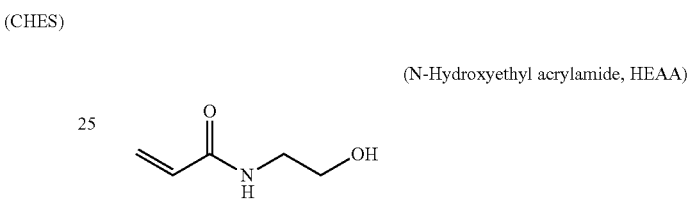
(N-Hydroxyethyl acrylamide, HEAA)

Where the capping group comprises a styrene-containing group, suitable styrene-containing capping groups may include:

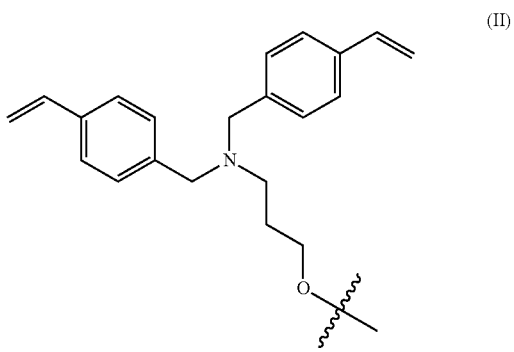
(II)

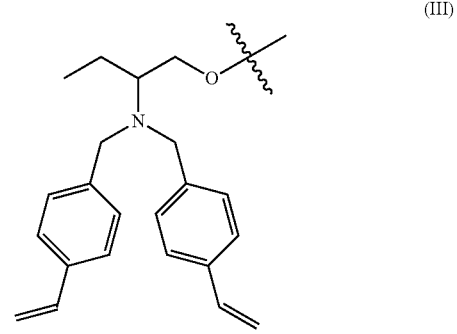
(III)

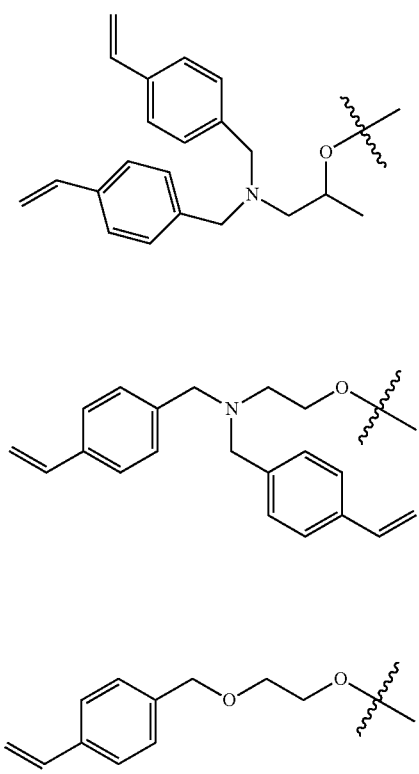

Styrene-containing groups (e.g. Groups (II) to (VI) above) may be formed by reacting the suitable styrene-containing mono-alcohols or monoamines with the polyurethane pre-polymer. For example, the styrene-containing monoalcohol may react with terminal —N═C═O groups on the polyurethane pre-polymer. The styrene-containing mono-alcohols corresponding to Groups (II) to (VI) above may be:

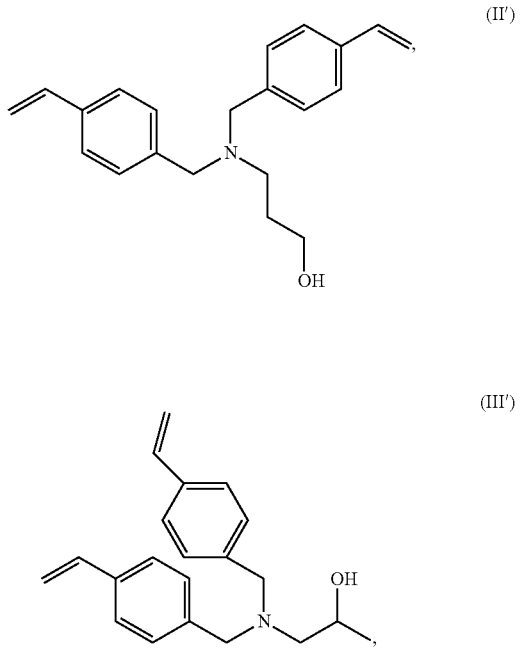

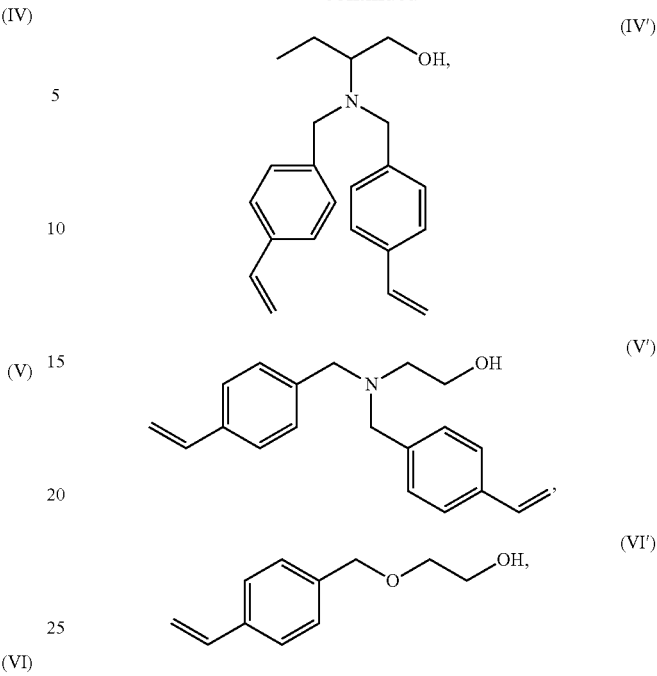

Where the capping group comprises an allyl-containing group, the allyl-containing group may comprise an allyl ether group or an allyl amine group. Suitable allyl-containing capping groups include:

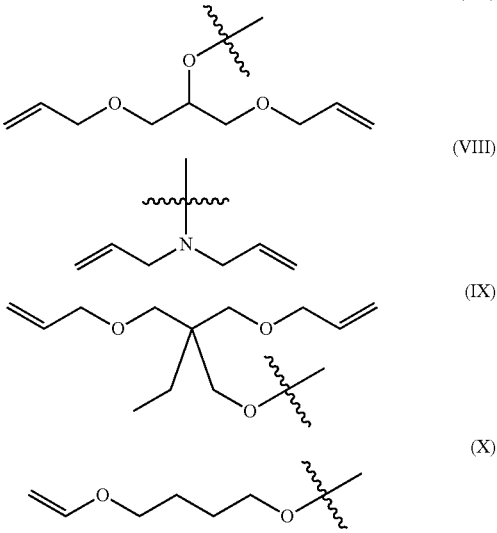

$CH_2$═$CHCH_2O$— (XI)

$CH_2$═$CHCH_2NH$— (XII)

$CH_2$═$CHOCH_2CH_2CH_2NH$— (XIII)

Allyl-containing groups (e.g. Groups (VII) to (XIII) above) may be formed by reacting the suitable allyl-containing mono-alcohols or monoamines with a polyurethane pre-polymer. For example, the allyl-containing monoalcohol or monoamine may react with terminal —N═C═O groups on the polyurethane pre-polymer. The allyl-containing mono-alcohols or monoamines corresponding to Groups (VII) to (XIII) above may be:

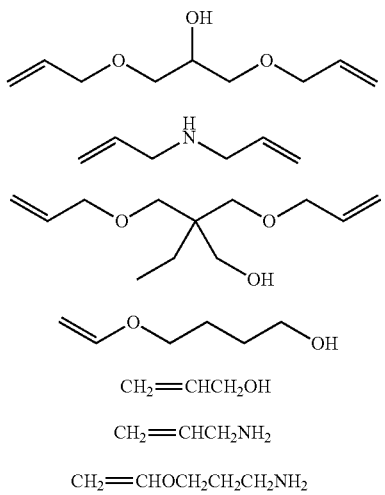

(VII')

(VIII')

(IX')

(X')

CH₂=CHCH₂OH (XI')

CH₂=CHCH₂NH₂ (XII')

CH₂=CHOCH₂CH₂CH₂NH₂ (XIII')

In one example, the polyurethane dispersion may comprise polyurethane polymers that comprise polyurethane backbones having terminal groups selected from acrylamide-containing groups, styrene-containing groups, and allyl-containing groups. The dispersion may be devoid of polyurethane polymers that comprise polyurethane backbones having terminal methacrylate-containing or acrylate-containing groups.

In one example, the polyurethane dispersion may comprise at least one polyurethane polymer comprising a polyurethane backbone having at least one terminal (or capping) group selected from an acrylamide-containing group, a styrene-containing group, an acrylate-containing group, a methacrylic-containing group and an allyl-containing group, and at least one polyurethane polymer comprising a polyurethane backbone having at least one terminal (or capping) ionic group; and/or at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and at the opposite end with a terminal ionic group.

In the polyurethane that is dispersed in the ink composition, 1 to 99 weight % of the capping groups may be ionic groups, while 99 to 1 weight % of the capping groups may be selected from an acrylamide-containing group, a styrene-containing group, an acrylate-containing group, a methacrylic-containing group and an allyl-containing group. In some examples, 5 to 70 weight % of the capping groups may be ionic groups, while 95 to 30 weight % of the capping groups may be selected from an acrylamide-containing group, a styrene-containing group, an acrylate-containing group, a methacrylic-containing group and an allyl-containing group. In some examples, 10 to 50 weight % of the capping groups may be ionic groups, while 90 to 50 weight % of the capping groups may be selected from an acrylamide-containing group, a styrene-containing group, an acrylate-containing group, a methacrylic-containing group and an allyl-containing group. In other examples, 20 to 40 weight % of the capping groups may be ionic groups, while 80 to 60 weight % of the capping groups may be selected from an acrylamide-containing group, a styrene-containing group, an acrylate-containing group, a methacrylic-containing group and an allyl-containing group.

In one example, the polyurethane dispersion may comprise at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and capped at the opposite end with a terminal ionic group.

In one example, the polyurethane dispersion may comprise (i) at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and capped at the opposite end with a terminal ionic group; and (ii) at least one polyurethane polymer comprising a polyurethane backbone that is capped at both ends with a terminal (or capping) group selected from an acrylamide-containing group, a styrene-containing group, an acrylate-containing group, a methacrylic-containing group and an allyl-containing group or (iii) at least one polyurethane polymer comprising at least one polyurethane polymer comprising a polyurethane backbone that is capped at both ends with ionic groups.

In one example, the polyurethane dispersion may comprise (i) at least one polyurethane polymer comprising a polyurethane backbone that is capped at one end with a terminal (or capping) group selected from an acrylamide-containing group, a styrene-containing group, an acrylate-containing group, a methacrylic-containing group and an allyl-containing group and capped at the opposite end with a terminal ionic group; (ii) at least one polyurethane polymer comprising a polyurethane backbone that is capped at both ends with a terminal (or capping) group selected from an acrylamide-containing group, a styrene-containing group, an acrylate-containing group, a methacrylic-containing group and an allyl-containing group and (iii) at least one polyurethane polymer comprising at least one polyurethane polymer comprising a polyurethane backbone that is capped at both ends with ionic groups.

The ionic group may be a carboxylic acid group and/or a sulphonic acid group. The ionic group may be formed by reacting an amino carboxylic acid or an amino sulphonic with a polyurethane pre-polymer, for example, with terminal —N=C=O groups on the polyurethane pre-polymer. Suitable amino sulphonic acids include taurine, CAPS or CHES (see above). The ionic groups may help to keep the polyurethane particles in dispersion in water.

In one example, the polyurethane dispersion may comprise at least one polyurethane polymer comprising a polyurethane backbone having at least one terminal (or capping) group selected from a methacrylic-containing group and/or an acrylate-containing group, and at least one polyurethane polymer comprising a polyurethane backbone having at least one terminal (or capping) ionic group selected from

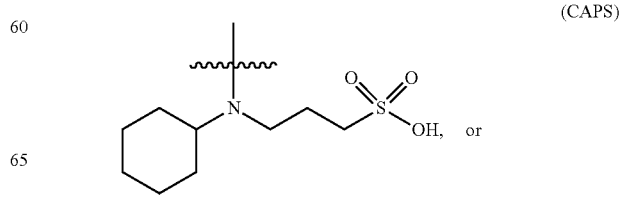

(CAPS)

OH, or (CHES)

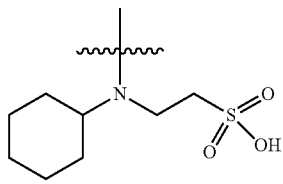

and/or at least one polyurethane polymer comprising a polyurethane backbone that is capped at one end with a terminal (or capping) group selected from a methacrylic-containing group and/or an acrylate-containing group, and at the opposite end with a terminal group selected from CAPS or CHES above. In the polyurethane that is dispersed in the ink composition 1 to 99 weight % of the capping groups may be CAPS and/or CHES, while 99 to 1 weight % of the capping groups may be selected from an acrylate-containing group and/or a methacrylic-containing group. In some examples, 5 to 70 weight % of the capping groups may be CAPS and/or CHES, while 95 to 30 weight % of the capping groups may be selected from an acrylate-containing group and/or a methacrylic-containing group. In some examples, 10 to 50 weight % of the capping groups may be CAPS and/or CHES, while 90 to 50 weight % of the capping groups may be selected from an acrylate-containing group and/or a methacrylic-containing group. In some examples, 20 to 40 weight % of the capping groups may be CAPS and/or CHES, while 80 to 60 weight % of the capping groups may be selected from an acrylate-containing group and/or a methacrylic-containing group.

In one example, the polyurethane dispersion may comprise at least one polyurethane polymer comprising a polyurethane backbone that is capped at one end with a terminal (or capping) group selected from an acrylate-containing group and/or a methacrylic-containing group and capped at the opposite end with a terminal CAPS or CHES group.

In one example, the polyurethane dispersion may comprise (i) at least one polyurethane polymer comprising a polyurethane backbone that is capped at one end with a terminal (or capping) group selected from an acrylate-containing group and/or a methacrylic-containing group, and capped at the opposite end with a terminal CAPS or CHES group; and (ii) at least one polyurethane polymer comprising a polyurethane backbone that is capped at both ends with a terminal (or capping) group selected from an acrylate-containing group and/or a methacrylic-containing group or (iii) at least one polyurethane polymer comprising at least one polyurethane polymer comprising a polyurethane backbone that is capped at both ends with terminal groups selected from CAPS and/or CHES groups.

In one example, the polyurethane dispersion may comprise (i) at least one polyurethane polymer comprising a polyurethane backbone that is capped at one end with a terminal (or capping) group selected from an acrylate-containing group and/or a methacrylic-containing group and capped at the opposite end with a terminal CAPS or CHES group; (ii) at least one polyurethane polymer comprising a polyurethane backbone that is capped at both ends with a terminal (or capping) group selected from an acrylate-containing group and/or a methacrylic-containing group and (iii) at least one polyurethane polymer comprising at least one polyurethane polymer comprising a polyurethane backbone that is capped at both ends with terminal groups selected from CAPS and/or CHES groups.

Suitable acrylate- or methacrylate-containing capping groups may include

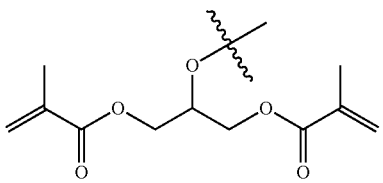

(XIV)

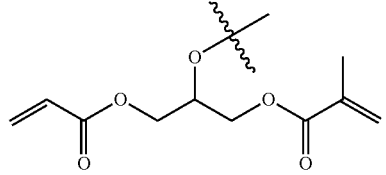

(XV)

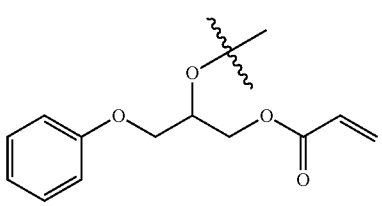

(XVI)

Groups (XIV) to (XIVI) above may be formed by reacting the corresponding methacrylate/acrylate-containing mono-alcohols with a polyurethane pre-polymer, for example, with —N=C=O terminal groups on the pre-polymer.

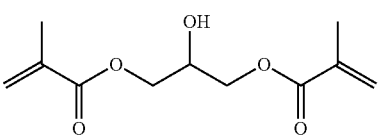

(XIV')

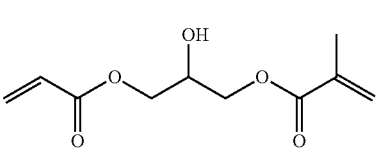

(XV')

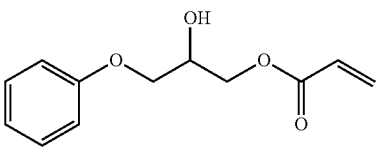

(XVI')

The polyurethane backbone of the polyurethane polymers present in the pH stable polyurethane dispersion may be formed from the reaction between a reactive diol and a diisocyanate. The reactive diol may be selected from an acrylate-containing diol, a methacrylate-containing diol, acrylamide-containing diol, styrene-containing diol, allyl-containing diol and combinations thereof. For example, where the capping unit comprises an acrylamide-containing group, the reactive diol may be selected from an acrylate-containing diol, a methacrylate-containing diol and an acrylamide-containing diol. Where the capping unit comprises a styrene-containing group, the reactive diol may be selected from an acrylate-containing diol, a methacrylate-containing diol and a styrene-containing diol. Where the capping unit comprises an allyl-containing group, the reactive diol may be selected from an acrylate-containing diol, a methacrylate-containing diol and an allyl-containing diol.

Suitable methacrylate-containing and acrylate-containing reactive diols may include:

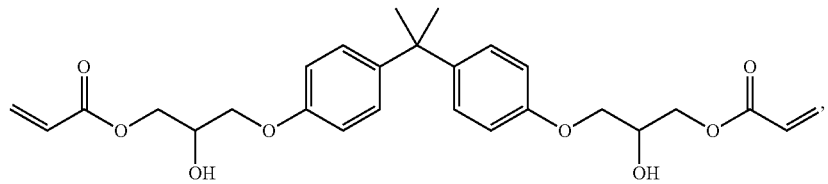

(BGDA-XVII)

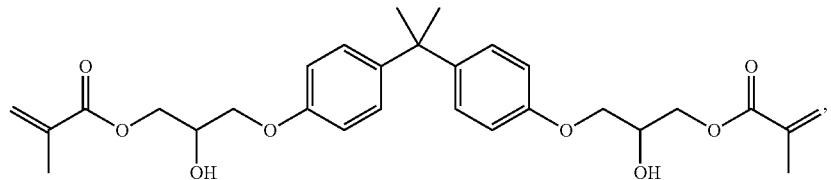

(XVIII)

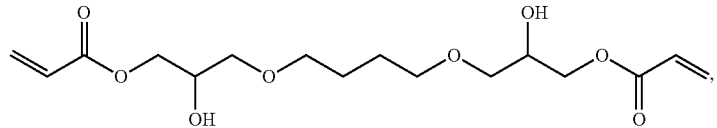

(XIX)

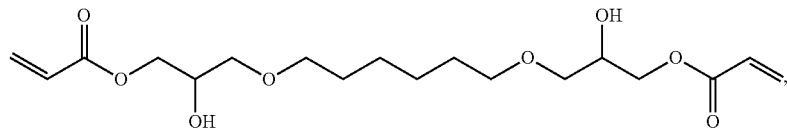

(XX)

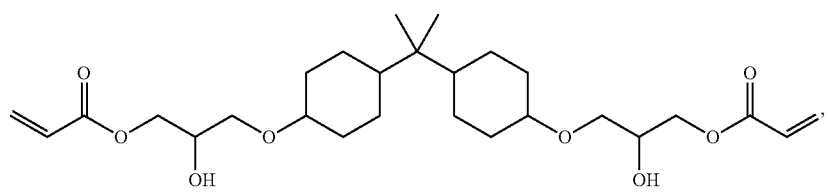

(XXI)

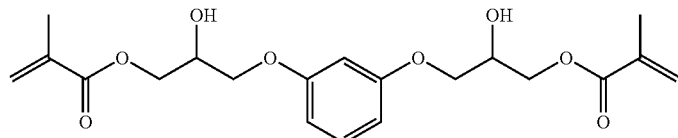

(XXII)

The reactive diol may also be a styrene-containing reactive diol selected from:

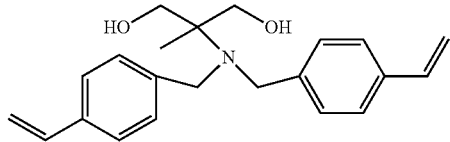
(XXIII)

and

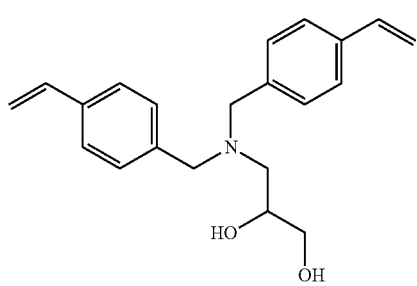
(XXIV)

The reactive diol may also be an allyl-containing containing diol selected from:

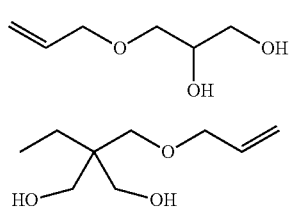
(XXV)

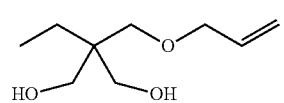
(XXVI)

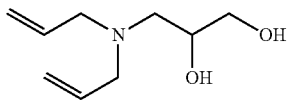
(XXVII)

Suitable diisocyanates include methylene diphenyl diisocyanate, hexamethylene diisocyanate, p-tetramethyl xylene diisocyanate, m-tetramethyl xylene diisocyanate, bitolylene diisocyanate, toluene diisocyanate, 4,4'-Methylene dicyclohexyl diisocyanate, p-phenylene diisocyanate, isophorone diisocyanate, 1,5-naphthalene diisocyanate, trimethylhexamethylene diisocyanate and mixtures thereof.

In one example, the diisocyanate is selected from at least one of 2,2,4-trimethyl hexamethylene diisocyanate, isophorone diisocyanate, hexamethylene diisocyanate, methylene diphenyl diisocyanate and 4,4'-Methylene dicyclohexyl diisocyanate.

A blend of two diisocyanates may be used. For example, the diisocyanates may be a blend of 4,4'-Methylene dicyclohexyl diisocyanate and hexamethylene diisocyanate.

In one example, a blend of at least two diisocyanates is reacted with a reactive diol to produce the polyurethane backbone. The reactive diol may be a methacrylate-containing and/or acrylate-containing reactive diol. In some examples, the reactive diol may be an acrylamide-containing reactive diol, an allyl-containing reactive diol and/or a styrene-containing reactive diol. In one example, the reactive diol may be a methacrylate-containing or acrylate-containing diol that is bisphenol A-free. As shown above, examples of such diols include:

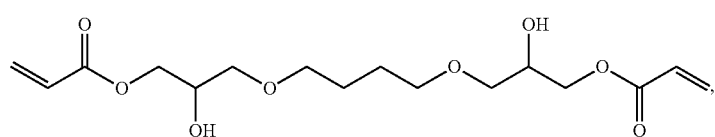
(XIX)

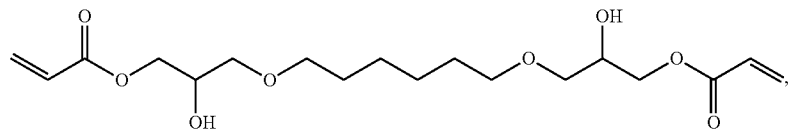
(XX)

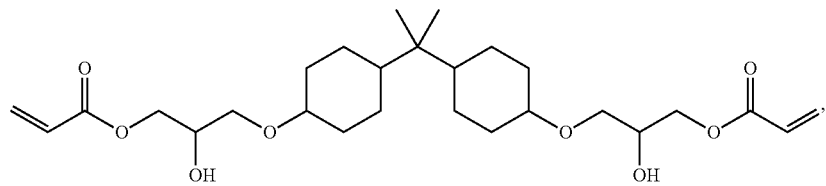
(XXI)

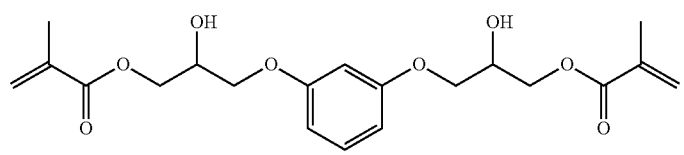
(XXII)

The polyurethane backbone may be devoid of any ionic side groups, for example, acid stabilisation groups (e.g. carboxylic or sulphonic acid groups). Such ionic groups may act as capping groups at the terminal end(s) of at least some of the polyurethane polymer strands in the polyurethane dispersion.

In one example, the polyurethane dispersion is formed by reacting a reactive diol with a diisocyanate to form a polyurethane pre-polymer. A polymerisation initiator may be used to initiate polymerisation. The NCO/OH ratio may range from greater to 1 to 8, for example, 1.2 to 5.

The polymerisation may be carried out to produce a polyurethane pre-polymer. Once the polyurethane pre-polymer is formed, a capping agent may be added to the reaction mixture. For example, the capping agent may be a monoalcohol or monoamine selected from a methacrylate-containing monoalcohol, an acrylate-containing monoalcohol, a acrylamide-containing monoalcohol, a styrene-containing monoalcohol, an allyl-containing monoalcohol or an allyl-containing monoamine. The monoalcohol or monoamine may react with terminal —N═C═O groups on the polyurethane pre-polymer to cap the polyurethane pre-polymer. The reaction is carried out such that at least some of the polyurethane pre-polymer strands are capped by this reaction. In some examples, most of the polyurethane pre-polymer strands are capped by this reaction. For example, at least 10% of unreacted —N═C═O groups are capped by this reaction. In some instances, 40 to 99% or 50 to 90%, for instance, 60 to 85% of unreacted —N═C═O groups are capped by this reaction.

An amino carboxylic acid or an amino sulphonic acid may then be added to the reaction mixture. As mentioned above, suitable acids include taurine, 3-(cyclohexylamino)-1-propanesulfonic acid and 2-(cyclohexylamino)ethanesulfonic acid. The amino carboxylic acid or amino sulphonic acid may react with the remaining —N═C═O groups. These groups form can form ionic capping groups that help to stabilise the dispersion of polyurethane in e.g. water.

The pH stable curable polyurethane may have an acid number of 20 to 100. The pH stable curable polyurethane may have a double bond density from 1.5 to 1.0 meq/g.

The particle size range of the pH stable polyurethane dispersion may be 10 to 200 nm.

Any suitable surfactant may be present in the inkjet ink composition. Suitable surfactants are described in relation to the overcoat composition above. The surfactant employed in the inkjet ink composition may be the same or different from the surfactant used in the overcoat composition. When present, the surfactant present in the inkjet ink composition in an amount ranging from about 0.01 wt % to about 5 wt % based on the total wt % of the inkjet ink composition.

The inkjet ink composition may include a co-solvent in addition to water. Classes of co-solvents that may be used can include organic co-solvents, including alcohols (e.g., aliphatic alcohols, aromatic alcohols, polyhydric alcohols (e.g., diols), polyhydric alcohol derivatives, long chain alcohols, etc.), glycol ethers, polyglycol ethers, a nitrogen-containing solvent (e.g., pyrrolidinones, caprolactams, formamides, acetamides, etc.), and a sulfur-containing solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still other examples of suitable co-solvents include propylene carbonate and ethylene carbonate.

A single co-solvent may be used, or several co-solvents may be used in combination. When included, the co-solvent(s) is/are present in total in an amount ranging from 0 wt % to 60 wt %, depending on the jetting architecture, though amounts outside of this range can also be used. As other example, the co-solvent(s) may range from about 1 wt % to about 30 wt % or about 20 wt % of the total wt % of the inkjet ink composition.

The inkjet ink composition may also include various other additives to enhance the properties of the ink composition for specific applications. Examples of these additives include those added to inhibit the growth of microorganisms, viscosity modifiers, materials for pH adjustment, sequestering agents, anti-kogation agents, preservatives, and the like. Such additives may be present in an amount of 0 to 5 wt % of the inkjet ink composition.

Printing Process

As described above, the present disclosure relates to a process that comprises inkjet printing an inkjet ink composition onto a substrate. A radiation-curable overcoat composition is inkjet printed over the printed inkjet ink composition on the substrate. Thereafter, the printed inkjet ink composition on the substrate is cured by exposing both the overcoat composition and inkjet ink composition on the substrate to radiation.

Prior to the inkjet printing the inkjet ink composition onto the substrate, the substrate may be treated, for example, with corona treatment. Prior to inkjet printing the inkjet ink composition onto the substrate, a fixer composition may be applied to the substrate. The fixer may help to optimise the deposition of pigment onto the print substrate. Suitable fixers may include one or more calcium salts and water. Examples of suitable calcium salts include calcium nitrate tetrahydrate and calcium propionate. In one example, the fixer comprises calcium nitrate tetrahydrate and calcium propionate. Surfactant may also be present in the fixer composition. A suitable surfactant may be a non-ionic surfactant, for example, Surfonyl® SEF. The fixer may also include a biocide. A suitable biocide may be Adicide® B20. Water may be present in the fixer in an amount of 5 to 30 weight % of the fixer composition. The fixer may be applied after the substrate has been treated by corona treatment. In some examples, the fixer may be applied to a substrate that has not been corona treated.

Any suitable inkjet ink printing method may be used. Examples include thermal and piezoelectric inkjet printing. In some examples, thermal inkjet printing is employed.

After the inkjet ink composition is printed onto the substrate, it may be dried prior to application of the overcoat composition.

Once the overcoat is applied, it may be dried prior to the curing step.

Any suitable source of radiation may be used to cure the inkjet ink and overcoat. In one example, UV radiation is employed. Suitable sources of UV radiation include UV lamps, LED (light emitting diode) lamps, LEP (light emitting plasma) plasma torches, or lasers operating in the UV range.

The actual wavelength (within the UV range of 280 nm to 400 nm) and intensity of the ultraviolet radiation used may vary, depending at least in part, upon the curable polyurethane in the binder and inkjet ink composition. Examples of suitable UV LED wavelengths include 365 nm, 385 nm, 395 nm or 405 nm, for example, 365 nm and 395 nm.

The printing process of the present disclosure can be used to print on a broad selection of substrates, including untreated plastics, flexible as well as rigid, porous or non-porous substrates. Some examples include paper (e.g., plain paper, coated, glossy paper, etc.), cardboard, foam board, textile, and plastics. Examples of suitable plastic substrates include vinyl substrates, for example, vinyl graphic films available from 3M™ under the trademark Scotchcal™ series IJ-40. Other examples include acrylic substrates, for example, acrylic cast graphic films available from 3M™ under the trademark Controltac™ (e.g. 180-10(cast)). Other examples include acrylic glass substrates (PMMA), polypropylene substrates, polystyrene substrates (e.g. high impact polystyrene substrates), PVC substrates and polycarbonate substrates. To further illustrate the present disclosure, examples are given herein. It is to be understood that these examples are provided for illustrative purposes and are not to be construed as limiting the scope of the present disclosure.

FIG. 1 depicts schematically, by way of example only, an example of the sequence of steps that may be taken to perform an example inkjet printing process of the present disclosure. As can be seen from the FIGURE, a fixer 10 may be applied to a print substrate 12. An ink jet ink composition 14 may then be inkjet printed over the fixer. The printed ink layer may be dried by a dryer 16. Thereafter, a digital overcoat composition 18 may be inkjet ink printed over the printed ink layer as an overcoat layer. The overcoat layer may then by dried 20. Thereafter, the over coated print layer may be cured by exposure to UV-LED 22.

EXAMPLES

Example 1—Synthesis of Curable pH Stable Acrylamide-Based PUD (PUD 382)

33.732 g of g of BGDA (see compound XVII above), 0.337 g of 4-methoxyphenol (MEHQ), 40.176 g of 4,4'-Methylene dicyclohexyl diisocyanate (H12MDI), 3.095 g of isophorone diisocyanate (IPDI) and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept dry. 3 drops of dibutyltin dilaurate (DBTDL) was added to initiate the polymerization. Polymerization was continued for 3 hrs at 60° C. 0.5 g samples was withdrawn for % NCO titration to confirm the reaction. The measured NCO value was 10.32%. Theoretical % NCO should be 10.63%. 16.028 g of HEAA (N-hydroxylethyl acrylamide, CAS #7646-67-5, purchased from Sigma Aldrich), 0.160 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.49%. The theoretical % NCO should have been 2.51%. The polymerization temperature was reduced to 40° C. 6.969 g of taurine, 4.678 g of 50% NaOH, and 34.846 g of deionized water are mixed in a beaker until taurine was completely dissolved. Taurine solution was added to the pre-polymer solution at 40° C. with vigorous stirring over 1-3 mins. The solution became viscous and slight hazy. Stirring was continued for 30 mins at 40° C. The mixture became clear and viscous after 15-20 mins at 40° C. Cold 197.314 g of deionized water was added to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK®011 de-foaming agent if there was a lot of foaming). The final PUD dispersion was filtered through fiber glass filter paper. Particle size measured by Malvem Zetasizer is 25.5 nm. Its pH was 7.4. Solid content was 30.0%. This PUD shows less than 0.4 unit pH drop after 1 week accelerated shelf life testing (ASL) (storage at 60 degrees C.).

Example 2—Synthesis of Curable pH Stable Acrylamide-Based PUD (cPUD 251)

38.884 g of g of BGDA (see compound XVII above), 0.389 g of 4-methoxyphenol (MEHQ), 42.103 g of 4,4'-Methylene dicyclohexyl diisocyanate (H12MDI), and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept dry. 3 drops of DBTDL was added to initiate the polymerization. Polymerization was continued for 3 hrs at 60° C. 0.5 g samples was withdrawn for % NCO titration to confirm the reaction. The measured NCO value was 7.6%. Theoretical % NCO should have been 8.32%. 12.318 g of HEAA (N-hydroxylethyl acrylamide, CAS #7646-67-5, purchased from Sigma Aldrich), 0.159 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.41%. The theoretical % NCO should have been 2.41%. The polymerization temperature was reduced to 40° C. 6.695 g of taurine, 4.494 g of 50% NaOH, and 33.474 g of deionized water are mixed in a beaker until taurine was completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 194.649 g of deionized water to polymer mixture in 4-neck round bottom flask over 1-3 mins with good agitation to form polyurethane dispersion (PUD). The agitation was continued for 60 mins at 40° C. The PUD dispersion was filtered through 400 mesh stainless sieve. Acetone was removed with rotorvap at 50° C. (add 2 drops (20 mg) BYK®-011 de-foaming agent if there was a lot of foaming). The final PUD dispersion was filtered through fiber glass filter paper. Particle size measured by Malvem Zetasizer is 26.8 nm. Its pH was 6.0. Solid content was 30.04%. This PUD shows less than 0.4 unit pH drop after 1 week of storage at 60 degrees C. (accelerated shelf life (ASL) test).

Example 3

The curable pH stable PUD produced in Example 1 was used to formulate an inkjet ink composition.

| Component | Weight % |
|---|---|
| Surfactant (Surfonyl ® CT-211, supplied by AirProducts ®) | 0.80 |
| Dynax ® DX-4000 (fluorsurfactant, supplied by Dynax ®) | 0.50 |
| Water soluble photoinitiator (TPA Na) | 0.50 |
| Water soluble sensitizer[2] | 0.25 |
| curable PUD of Example 1 | 0-12.0[1] |
| Black or Magenta pigment | 2.5 and 4.0, respectively |
| Water | Balance |

[1] 0 to 3.6 weight % polyurethane (solids) dispersed in ink composition;

[2] A photosensitizer based on functionalised anthrone moiety coupled to a polyether chain, see Q above.

Example 4

A curable overcoat composition was prepared as follows:

| Component | Weight % |
|---|---|
| Surfactant (Surfonyl ® CT-211, supplied by AirProducts ®) | 0.80 |
| Dynax ® DX-4000 (fluorsurfactant, supplied by Dynax ®) | 0.50 |
| Water soluble photoinitiator (TPA Na) | 0.50 |
| Water soluble sensitizer[2] | 0.25 |
| curable PUD of Example 1 | 5, 7.5 and 10, respectvel1.5[1] |
| Water | Balance |

[1] 1.5, 2.25 to 3.0 weight % polyurethane (solids) dispersed in overcoat composition;

[2] A photosensitizer based on a functionalised anthrone moiety coupled to a polyether chain, see Q above.

Example 5

In this example, a fixer composition was applied to a vinyl substrate. Thereafter, the inkjet ink compositions of Example 3 were inkjet printed over the substrate using a thermal inkjet printer. The printed inkjet ink composition was dried and then overprinted (by thermal inkjet printing) with the overcoat composition of Example 4. The printed substrate was then dried and cured using UV-LED at 395 nm.

The cured substrates were subjected to tests to determine their durability with respect to a Windex rub test (1 weight (250 g), 5 cycles, Crockmeter cloth), a 70% IPA rub test (1 weight (250 g), 5 cycles, Crockmeter Cloth, an eraser rub test (1 weight (250 g), 10 cycles) and a tape adhesion test. The tested substrates were inspected by visual inspection. The rub tests (Windex, 70% IPA) were graded with a score of 0 (best) to 5 (worst). The tape adhesion test was graded with a score of 1 (best) to 5 (worst). The results are shown in tables 1 and 2 below. Table 1 shows the results for the magenta inks, while Table 2 shows the results for the black inks.

TABLE 1

| Wt % cPUD in ink/(wt % polyurethane (solids) in ink) | Wt % cPUD in overcoat/(wt % polyurethane (solids) in overcoat) | Optical Density (OD) | 75° gloss | Windex | Tape Adhesion | 70% IPA |
|---|---|---|---|---|---|---|
| 0 (0) | 5 (1.5) | 1.1 | 79 | 5 | 1.5 | 5 |
| 3 (0.9) | 5 (1.5) | 1.01 | 71 | 3 | 0 | 5 |
| 6 (1.8) | 5 (1.5) | 1.13 | 76 | 0.5 | 0 | 3.5 |
| 9 (2.7) | 5 (1.5) | 1.26 | 77 | 0 | 0 | 0.5 |
| 12 (3.6) | 5 (1.5) | 1.33 | 78 | 0 | 0 | 0.5 |
| 0 (0) | 7.5 (2.25) | 1.13 | 89 | 5 | 1.5 | 5 |
| 3 (0.9) | 7.5 (2.25) | 0.99 | 77 | 2 | 2 | 4 |
| 6 (1.8) | 7.5 (2.25) | 1.19 | 77 | 0 | 0 | 0.5 |
| 9 (2.7) | 7.5 (2.25) | 1.3 | 80 | 0 | 0 | 0.5 |
| 12 (3.6) | 7.5 (2.25) | 1.37 | 82 | 0 | 0.5 | 0.5 |
| 0 (0) | 10 (3.0) | 1.15 | 89 | 4.5 | 1.5 | 4 |
| 3 (0.9) | 10 (3.0) | 1.01 | 80 | 0 | 3.5 | 3.5 |
| 6 (1.8) | 10 (3.0) | 1.21 | 81 | 0 | 0.5 | 0.5 |
| 9 (2.7) | 10 (3.0) | 1.34 | 83 | 0 | 2 | 0.5 |
| 12 (3.6) | 10 (3.0) | 1.38 | 84 | 0 | 0.5 | 0.5 |

TABLE 2

| Wt % cPUD in ink/(wt % polyurethane (solids) in ink) | Wt % cPUD in overcoat/(wt % polyurethane (solids) in overcoat) | Optical Density (OD) | 75° gloss | Windex | Tape Adhesion | 70% IPA |
|---|---|---|---|---|---|---|
| 0 (0) | 5 (1.5) | 1.02 | 78 | 5 | 2 | 5 |
| 3 (0.9) | 5 (1.5) | 1.17 | 81 | 4 | 0 | 5 |
| 6 (1.8) | 5 (1.5) | 1.44 | 83 | 2 | 0 | 4.5 |
| 9 (2.7) | 5 (1.5) | 1.36 | 84 | 0 | 0.5 | 2 |
| 12 (3.6) | 5 (1.5) | 1.52 | 84 | 0 | 2.5 | 2 |
| 0 (0) | 7.5 (2.25) | 1.05 | 93 | 5 | 1.5 | 5 |
| 3 (0.9) | 7.5 (2.25) | 1.06 | 85 | 3 | 0 | 4.5 |
| 6 (1.8) | 7.5 (2.25) | 1.28 | 85 | 0 | 0 | 2 |
| 9 (2.7) | 7.5 (2.25) | 1.42 | 87 | 0 | 2.5 | 0.5 |
| 12 (3.6) | 7.5 (2.25) | 1.56 | 88 | 0 | 2 | 0 |
| 0 (0) | 10 (3.0) | 1.08 | 96 | 4 | 1.5 | 4 |
| 3 (0.9) | 10 (3.0) | 1.05 | 87 | 2 | 0.5 | 2.5 |
| 6 (1.8) | 10 (3.0) | 1.26 | 88 | 2 | 0.5 | 2 |
| 9 (2.7) | 10 (3.0) | 1.39 | 89 | 0 | 2 | 0 |
| 12 (3.6) | 10 (3.0) | 1.53 | 89 | 0 | 2.5 | 0 |

Example 6

In this Example, the curable pH stable polyurethane dispersion of Example 2 was used to formulate inkjet ink compositions as follows:

| Component | Weight % |
|---|---|
| Surfactant (Surfonyl ® CT-211, supplied by AirProducts ®) | 0.80 |
| Dynax ® DX-4000 (fluorsurfactant, supplied by Dynax ®) | 0.50 |
| Water soluble photoinitiator (TPA Na) | 0.50 |
| Water soluble sensitizer[2] | 0.25 |
| curable PUD of Example 2 | 5 or 10[1] |
| Black or Magenta pigment | 2.5 and 4.0, respectively |
| Water | Balance |

[1] 1.5 to 3.0 weight % polyurethane (solids) dispersed in ink composition;

[2] A photosensitizer based on a functionalised anthrone moiety coupled to a polyether chain; see Q above.

A curable overcoat composition was produced as described in Example 4 but the pH stable PUD produced in Example 1 was replaced with the pH stable polyurethane dispersion of Example 2.

The procedure of Example 5 was repeated with the inkjet ink compositions and overcoat compositions of this Example. The cured substrates were tested according to the Windex rub test and 70% IPA rub test as described in Example 5 above. In addition, the cured substrates were tested by an eraser rub test (1 weight (250 g), 10 cycles), a quanta regular Sutherland rub test (4 lbs, 200 cycles, Mellotex) and a quanta wet test (Taber test tool used with Crockmeter cloth attached to the tip, Weight load is 350 gram for 1 cycle).

For the Sutherland tests, a score of 5 is indicative of excellent rub resistance, while a score of 1 shows poor rub resistance. The remaining rub tests (Windex, 70% IPA, Eraser rub) and the quanta wet test were graded with a score of 0 (best) to 5 (worst). The results are shown in Table 3 below.

TABLE 3

| Wt % cPUD in ink/(wt % polyurethane (solids) in ink | Wt % cPUD in overcoat/ (wt % polyurethane (solids) in overcoat | Colour | Optical Density (OD) | 75° gloss | Eraser Rub | Windex Rub | 70% IPA | Quanta wet | Quanta Sutherland |
|---|---|---|---|---|---|---|---|---|---|
| 5 (1.5) | 5 (1.5) | B | 1.46 | 68 | 2.5 | 3.5 | 5 | 0 | 5 |
| 5 (1.5) | 5 (1.5) | M | 1.47 | 63 | 3 | 0.5 | 3 | 0 | 5 |
| 10 (3.0) | 5 (1.5) | B | 1.72 | 79 | 2 | 0.5 | 2 | 0 | 5 |
| 10 (3.0) | 5 (1.5) | M | 1.58 | 71 | 2 | 0.5 | 0.5 | 0 | 4 |
| 5 (1.5) | 10 (3.0) | B | 1.5 | 77 | 2 | 0.5 | 3 | 0 | 5 |
| 5 (1.5) | 10 (3.0) | M | 1.44 | 67 | 2.5 | 0 | 0.5 | 0 | 5 |
| 10 (1.5) | 10 (3.0) | B | 1.74 | 87 | 2 | 0 | 0.5 | 0 | 5 |
| 10 (1.5) | 10 (3.0) | M | 1.59 | 77 | 2 | 0 | 0.5 | 0 | 5 |

Examples 5 and 6 above show that, by using a digital overcoat composition, durable images can be produced. In contrast, in the absence of the digital overcoat compositions, curing of the black ink compositions was found to be very difficult. This is believed to be because of UV absorption by the black colorant, which reduced the efficiency of the curing process. Furthermore, the images produced in the absence of the digital overcoat had poor durability and very poor scores were achieved, particularly with respect to IPA rub resistance.

The invention claimed is:

1. An inkjet printing process comprising
   inkjet printing an inkjet ink composition onto a substrate to form a printed inkjet ink layer, the inkjet ink composition comprising a colorant, a curable polyurethane dispersion, a photoinitiator and water, wherein an amount of radiation-curable polyurethane dispersed in the inkjet ink composition is 0.1 to 30 weight %,
   inkjet printing a radiation-curable overcoat composition over the printed inkjet ink layer as an overcoat layer, said radiation-curable overcoat composition comprising a curable polyurethane dispersion, a photoinitiator and water, wherein an amount of curable polyurethane dispersed in the radiation-curable overcoat composition is 0.1 to 30 weight %, and
   curing the printed inkjet ink layer by exposing both the printed inkjet ink layer and the overcoat layer on the substrate to radiation, wherein the curable polyurethane in the overcoat layer and the curable polyurethane in the printed inkjet ink layer are crosslinked during curing to form a crosslinked polyurethane network.

2. The process as claimed in claim 1, wherein the overcoat layer and the printed inkjet ink layer on the substrate are cured by exposure to UV-LED.

3. The process as claimed in claim 1, wherein the curable polyurethane in the inkjet ink composition is present in an amount of 0.5 to 5 weight % of the inkjet ink composition.

4. The process as claimed in claim 1, wherein the curable polyurethane in the radiation-curable overcoat composition is present in an amount of 0.5 to 5 weight % of the radiation-curable overcoat composition.

5. The process as claimed in claim 1, wherein the curable polyurethane dispersion in the inkjet ink composition is the same as the curable polyurethane dispersion in the radiation-curable overcoat composition.

6. The process as claimed in claim 1, wherein the curable polyurethane dispersion in the inkjet ink composition and the curable polyurethane dispersion in the radiation-curable overcoat composition are each a pH stable curable polyurethane dispersion.

7. The process as claimed in claim 6, wherein the pH stable curable polyurethane dispersion comprises a polyurethane polymer comprising a polyurethane backbone having at least one terminal group selected from at least one of an acrylamide-containing group, a styrene-containing group, an allyl-containing group,

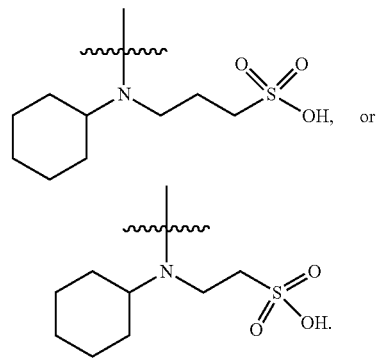

8. The process as claimed in claim 6, wherein the pH stable curable polyurethane dispersion comprises a polyurethane polymer comprising a polyurethane backbone that is capped at one end with a terminal group selected from at least one of an acrylamide-containing group, a styrene-containing group and an allyl-containing group and at the opposite end with a terminal carboxylic acid-, carboxylate anion-, sulphonic acid- or sulphonate anion-containing group.

9. The process as claimed in claim 6, wherein the pH stable curable polyurethane dispersion comprises a polyurethane polymer including a backbone that is capped at one end with a terminal group selected from an acrylamide-containing group, a styrene-containing group, an allyl-containing group, a methacrylate-containing or acrylate-containing group, and at the opposite end with a terminal group selected from at least one of:

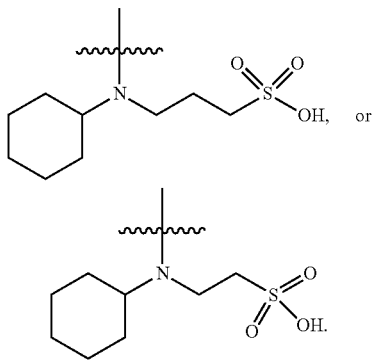

10. The process as claimed in claim 6, wherein the pH stable curable polyurethane dispersion comprises a polyurethane polymer formed from the reaction of a) a blend of at least 2 isocyanates and b) a reactive diol.

11. The process as claimed in claim 1, further comprising drying the printed inkjet ink composition on the substrate prior to application of the radiation-curable overcoat composition.

12. The process as claimed in claim 1, further comprising drying the radiation-curable overcoat composition on the substrate prior to the curing.

13. The process as claimed in claim 1, wherein a fixer is applied to the substrate prior to the inkjet printing of the inkjet ink composition.

14. The process as claimed in claim 1, wherein the photoinitiator in the inkjet ink composition, the radiation-curable overcoat composition, or the combination thereof is a trimethylbenzoylphenylphosphinic acid metal salt (i.e., TPA salt) having a formula of:

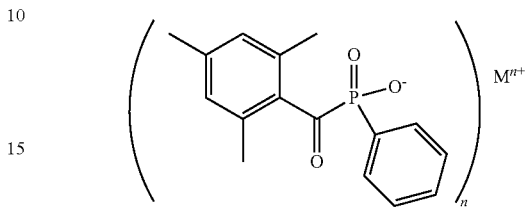

wherein n is any integer from 1 to 5, M is a metal selected from Li, Na, K, Cs, Rb, Be, Mg, Ca, Ba, Al, Ge, Sn, Pb, As, or Sb, and n+ is a valence from 1 to 5.

15. A printed substrate comprising a printed inkjet ink layer including a colorant and curable polyurethane disposed over the substrate, an overcoat layer including curable polyurethane disposed over the printed inkjet ink layer, and a polyurethane network that surrounds the colorant and extends from the inkjet ink layer to the overcoat layer, wherein the curable polyurethane in the overcoat layer and the curable polyurethane in the printed inkjet ink layer are crosslinked during curing such that reactive groups of the polyurethane in the overcoat layer crosslink with reactive groups of the polyurethane in the printed inkjet ink layer.

* * * * *